(12) United States Patent
Sethi et al.

(10) Patent No.: US 11,787,989 B2
(45) Date of Patent: *Oct. 17, 2023

(54) HEAT TRANSFER METHODS, SYSTEMS AND COMPOSITIONS

(71) Applicant: HONEYWELL INTERNATIONAL INC., Morris Plains, NJ (US)

(72) Inventors: Ankit Sethi, Buffalo, NY (US); Samuel F. Yana Motta, East Amherst, NY (US); Elizabet del Carmen Vera Becerra, Amherst, NY (US); Yang Zou, Buffalo, NY (US); Henna Tangri, Williamsville, NY (US); Gregory L. Smith, Niagara Falls (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,945

(22) Filed: May 18, 2021

(65) Prior Publication Data

US 2021/0355358 A1    Nov. 18, 2021

Related U.S. Application Data

(62) Division of application No. 16/135,962, filed on Sep. 19, 2018, now Pat. No. 11,008,494.

(60) Provisional application No. 62/587,600, filed on Nov. 17, 2017, provisional application No. 62/560,558, filed on Sep. 19, 2017.

(51) Int. Cl.
*F25B 9/00* (2006.01)
*C09K 5/04* (2006.01)

(52) U.S. Cl.
CPC ........ *C09K 5/045* (2013.01); *C09K 2205/122* (2013.01); *C09K 2205/24* (2013.01); *F25B 9/006* (2013.01)

(58) Field of Classification Search
CPC .............. C09K 5/045; C09K 2205/126; C09K 2205/22; C09K 5/04; C09K 2205/24; C09K 2205/122; C09K 5/044; C09K 5/041; F25B 9/006
USPC .............. 252/67, 68, 69; 62/467, 529, 324.1
See application file for complete search history.

(56) References Cited

U.S. PATENT DOCUMENTS

| | | | |
|---|---|---|---|
| 10,655,040 B2* | 5/2020 | Close | C09K 5/045 |
| 10,731,066 B2* | 8/2020 | Yana Motta | C09K 5/045 |
| 10,767,091 B2* | 9/2020 | Sethi | C10M 171/008 |
| 11,008,494 B2* | 5/2021 | Sethi | C09K 5/045 |
| 11,111,424 B2* | 9/2021 | Yana Motta | C09K 5/045 |
| 11,274,238 B2* | 3/2022 | Close | C09K 5/045 |
| 2010/0116417 A1* | 5/2010 | Cheung | H01G 2/103 156/155 |
| 2018/0079941 A1* | 3/2018 | Ueno | C09K 5/045 |

* cited by examiner

*Primary Examiner* — Douglas J McGinty
(74) *Attorney, Agent, or Firm* — Colleen D. Szuch

(57) ABSTRACT

Disclosed are methods for providing heating and/or cooling of the type comprising evaporating refrigerant liquid and condensing refrigerant vapor in a plurality of repeating cycles, where the method comprises (a) providing the refrigerant comprising at least about 5% by weight of a lower alkyl iodofluorocarbon; and (b) exposing at least a portion of said refrigerant in at least a portion of said plurality of said cycles to a sequestration material comprising: i) copper or a copper alloy; ii) a molecular sieve (preferably a zeolite), comprising copper, silver, lead or a combination thereof; iii) an anion exchange resin, and iv) a combination of two or more of these, wherein said exposing temperature is preferably above about 20 C.

17 Claims, 5 Drawing Sheets

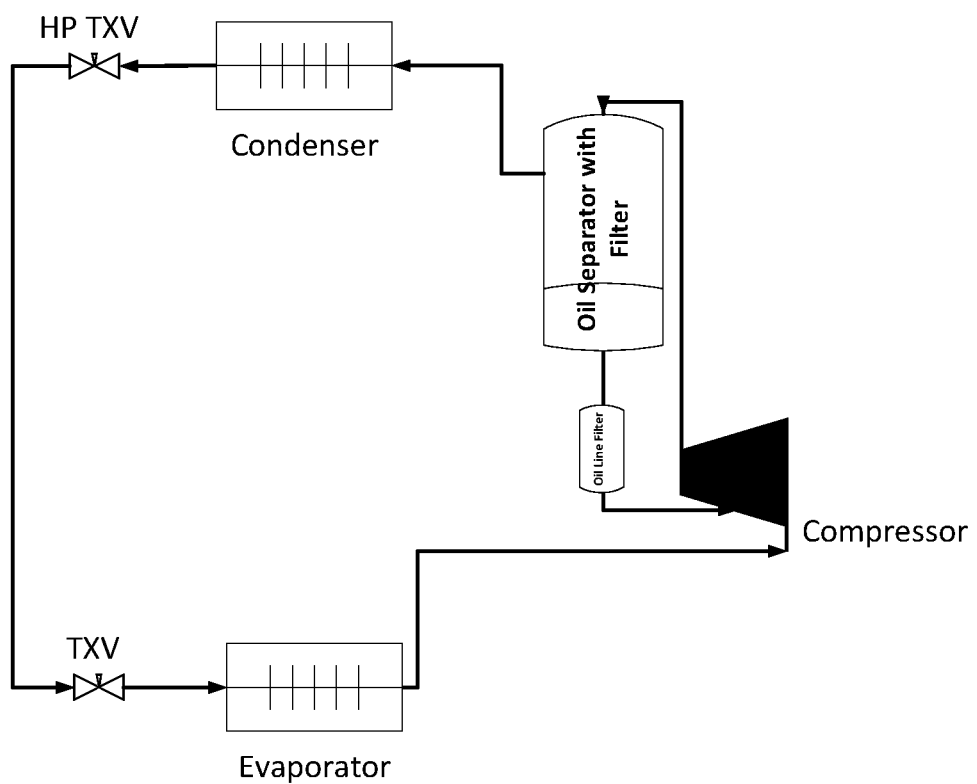
Figure 5: System Schematic with Filter in Oil Separator or Oil Return Line

HEAT TRANSFER METHODS, SYSTEMS AND COMPOSITIONS

REFERENCE TO RELATED APPLICATIONS

The present application is related to and claims the priority benefit of U.S. Provisional Application 62/560,558, filed Sep. 19, 2017 and of U.S. Provisional Application 62/587,600, filed Nov. 17, 2017, each of which is incorporated herein by reference.

FIELD OF THE INVENTION

The present invention relates to methods, systems and composition for transferring heat using iodofluorocarbon refrigerants, including air conditioning, refrigeration and heat pump methods and systems.

BACKGROUND

Mechanical heat transfer systems and related heat transfer devices, such as heat pumps and air conditioners, which use refrigerants are well known in the art for industrial, commercial and domestic applications. Certain chlorofluorocarbons (CFCs) were developed in the 1930s as refrigerants for such systems. However, since the 1980s, the effect of CFCs on the stratospheric ozone layer has become the focus of much attention. In 1987, a number of governments signed the Montreal Protocol to protect the global environment, setting forth a timetable for phasing out the use of CFC products. CFCs were replaced with more environmentally acceptable materials that contain hydrogen, namely certain hydrochlorofluorocarbons (HCFCs). However, subsequent amendments to the Montreal protocol accelerated the phase out of the CFCs and also scheduled the phase-out of HCFCs.

In response to the requirement for a more environmentally acceptable alternative to the CFCs and HCFCs that had been in use, the industry developed a number of hydrofluorocarbons (HFCs) which have zero ozone depletion potential. However, many of those same HFCs were subsequently found to have high Global Warming Potentials, and thus the industry sought alternative refrigerants which were environmentally acceptable in terms of both low global warming potentials, and low ozone depletion.

The iodoflurocarbon trifluoroiodomethane ("$CF_3I$") is known as a refrigerant, and has a very low Global Warning Potential (GWP) and Ozone Depletion Potential (ODP). US 2008/0116417, which assigned to the assignee of the present invention, discloses methods for removing iodine and iodide ions from heat transfer compositions which contain a hydrofluoroalkene and an iodocarbon. The '417 publication discloses that refrigerants which comprises iodocarbons, such as CF3I, can results in such compounds being exposed to certain components of the refrigeration system at temperatures and under other conditions which promote the formation of iodine, iodide ions, organic radicals, and iodine containing inorganic acids, which can negatively impact the reliability of the heat transfer system, and/or the stability of any lubricant present in the system. It is stated that these unwanted iodine and iodide ions can be removed from such heat transfer compositions and automobile refrigeration compositions by contacting the composition which is circulating within a heat transfer system or automobile refrigeration system with a metal impregnated molecular sieve, a metal impregnated ion exchange resin, a metal impregnated clay or a metal impregnated alumina.

While the methods, systems and compositions disclosed in the '417 publication may have been able to realize some degree of success in improving such systems, applicants have found that a particular selection of the particular materials and combinations of materials which are included in order to remove unwanted ions from the composition, and/or the particular location/manner in which the materials are included in the system and methods, and/or the temperature at which the composition and the materials are in contact, can produce surprisingly and unexpectedly excellent results, which in turn produce surprisingly and unexpectedly improved systems, methods and compositions, as disclosed in detail herein after.

BRIEF DESCRIPTION OF FIGURES

FIG. 5 illustrates schematically locations of sequestration materials according to embodiments of the present invention.

SUMMARY

Figure 1A:
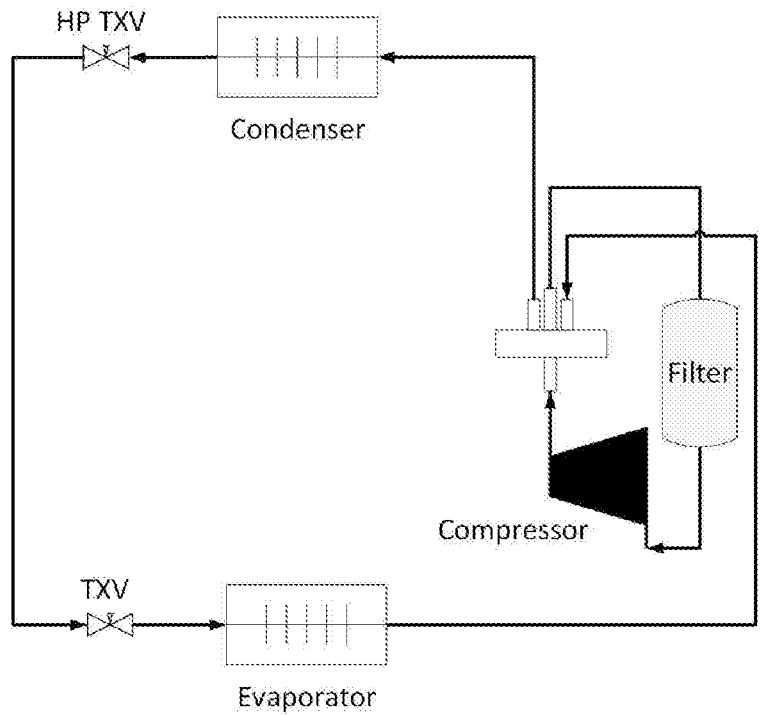
FIG. 1A illustrates schematically locations of sequestration materials according to embodiments of the present invention.

The present invention includes methods for providing transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:
  (a) providing a refrigerant comprising at least about 5% by weigh of a lower alkyl iodofluorocarbon;
  (b) optionally but preferably providing lubricant for said compressor; and
  (b) exposing at least a portion of said refrigerant and/or at least a portion of said lubricant in at least a portion of said plurality of said cycles to a sequestration material comprising:
    i. copper or a copper alloy,
    ii. activated alumina
    iii. a zeolite molecular sieve comprising copper, silver, lead or a combination thereof,
    iiv. an anion exchange resin,
    v. a moisture-removing material, preferably a moisture-removing molecular sieve,
    and
    iv. a combination of two or more of the above,
  wherein said exposing temperature is preferably above about 10° C. Methods for transferring heat according to this paragraph are referred to herein for convenience as Heat Transfer Method 1.

As used herein, the term "lower alkyl iodofluorocarbon" means an organic compound having from 1 to 4 carbon atoms and at least one fluorine substituent and at least one iodine substituent.

As used herein, the term "exposing temperature," means the temperature of either the refrigerant and/or the sequestration material, and preferably both, while the refrigerant and the sequestration material are in contact according the present exposing step of the present methods.

As used herein, the term "Refrigerant 1" refers to refrigerants comprising at least about 5% by weight of lower alkyl iodoflurocarbon.

As used herein, the term "Refrigerant 2" refers to refrigerants comprising at least about 5% by weight of $CF_3I$.

As used herein, the term "Refrigerant 3" refers to refrigerants comprising from about 5% by weight to about 70% by weight of lower alkyl iodoflurocarbon.

As used herein, the term "Refrigerant 4" refers to refrigerants comprising comprising from about 5% by weight to about 70% by weight of $CF_3I$.

As used herein, the term "Refrigerant 5" refers to refrigerants comprising from about 20% by weight to about 70% by weight of lower alkyl iodoflurocarbon.

As used herein, the term "Refrigerant 6" refers to refrigerants comprising comprising from about 20% by weight to about 70% by weight of $CF_3I$.

As used herein, the term "Refrigerant 7" refers to refrigerants comprising from about 45% by weight to about 60% by weight of lower alkyl iodoflurocarbon.

As used herein, the term "Refrigerant 8" refers to refrigerants comprising comprising from about 45% by weight to about 60% by weight of $CF_3I$.

As used herein, a sequestration material that includes two or more of (i.) copper or a copper alloy, (ii.) activated alumina, (iii.) zeolite molecular sieve comprising copper, silver, lead or a combination thereof, (iv.) an anion exchange resin, and (v.) a moisture-removing material is referred to herein as Sequestration Material 1.

As used herein, a sequestration material that includes two or more of (i.) copper or a copper alloy, (ii.) activated alumina, (iii.) zeolite molecular sieve comprising copper, silver, lead or a combination thereof, (iv.) an anion exchange resin, and (v.) a moisture-removing molecular sieve, is referred to herein as Sequestration Material 2.

As used herein, a sequestration material that includes each of (i.) copper or a copper alloy, (ii.) activated alumina, (iii.) zeolite molecular sieve comprising copper, silver, lead or a combination thereof, (iv.) an anion exchange resin, and (v.) a moisture-removing material is referred to herein as Sequestration Material 3.

As used herein, a sequestration material that includes two or more of (i.) copper or a copper alloy, (ii.) activated alumina, (iii.) zeolite molecular sieve comprising copper, silver, lead or a combination thereof, (iv.) an anion exchange resin, and (v.) a moisture-removing molecular sieve, is referred to herein as Sequestration Material 4.

The present invention includes heat transfer methods comprising Heat Transfer Method 1 in which the refrigerant is Refrigerant 2 and the sequestration material is Sequestration Material 1

The present invention includes heat transfer methods comprising Heat Transfer Method 1 in which the refrigerant is Refrigerant 2 and the sequestration material is Sequestration Material 2.

The present invention includes heat transfer methods comprising Heat Transfer Method 1 in which the refrigerant is Refrigerant 2 and the sequestration material is Sequestration Material 3.

The present invention includes heat transfer methods comprising Heat Transfer Method 1 in which the refrigerant is Refrigerant 2 and the sequestration material is Sequestration Material 4.

The present invention includes heat transfer methods comprising Heat Transfer Method 1 in which the refrigerant is Refrigerant 3 and the sequestration material is Sequestration Material 1.

The present invention includes heat transfer methods comprising Heat Transfer Method 1 in which the refrigerant is Refrigerant 3 and the sequestration material is Sequestration Material 2.

The present invention includes heat transfer methods comprising Heat Transfer Method 1 in which the refrigerant is Refrigerant 3 and the sequestration material is Sequestration Material 3.

The present invention includes heat transfer methods comprising Heat Transfer Method 1 in which the refrigerant is Refrigerant 3 and the sequestration material is Sequestration Material 4.

The present invention includes heat transfer methods comprising Heat Transfer Method 1 in which the refrigerant is Refrigerant 4 and the sequestration material is Sequestration Material 1.

The present invention includes heat transfer methods comprising Heat Transfer Method 1 in which the refrigerant is Refrigerant 4 and the sequestration material is Sequestration Material 2.

The present invention includes heat transfer methods comprising Heat Transfer Method 1 in which the refrigerant is Refrigerant 4 and the sequestration material is Sequestration Material 3.

The present invention includes heat transfer methods comprising Heat Transfer Method 1 in which the refrigerant is Refrigerant 4 and the sequestration material is Sequestration Material 4.

The present invention includes heat transfer methods comprising Heat Transfer Method 1 in which the refrigerant is Refrigerant 5 and the sequestration material is Sequestration Material 1.

The present invention includes heat transfer methods comprising Heat Transfer Method 1 in which the refrigerant is Refrigerant 5 and the sequestration material is Sequestration Material 2.

The present invention includes heat transfer methods comprising Heat Transfer Method 1 in which the refrigerant is Refrigerant 5 and the sequestration material is Sequestration Material 3.

The present invention includes heat transfer methods comprising Heat Transfer Method 1 in which the refrigerant is Refrigerant 5 and the sequestration material is Sequestration Material 4.

The present invention includes heat transfer methods comprising Heat Transfer Method 1 in which the refrigerant is Refrigerant 6 and the sequestration material is Sequestration Material 1.

The present invention includes heat transfer methods comprising Heat Transfer Method 1 in which the refrigerant is Refrigerant 6 and the sequestration material is Sequestration Material 2.

The present invention includes heat transfer methods comprising Heat Transfer Method 1 in which the refrigerant is Refrigerant 6 and the sequestration material is Sequestration Material 3.

The present invention includes heat transfer methods comprising Heat Transfer Method 1 in which the refrigerant is Refrigerant 6 and the sequestration material is Sequestration Material 4.

The present invention includes heat transfer methods comprising Heat Transfer Method 1 in which the refrigerant is Refrigerant 7 and the sequestration material is Sequestration Material 1.

The present invention includes heat transfer methods comprising Heat Transfer Method 1 in which the refrigerant is Refrigerant 7 and the sequestration material is Sequestration Material 2.

The present invention includes heat transfer methods comprising Heat Transfer Method 1 in which the refrigerant is Refrigerant 7 and the sequestration material is Sequestration Material 3.

The present invention includes heat transfer methods comprising Heat Transfer Method 1 in which the refrigerant is Refrigerant 7 and the sequestration material is Sequestration Material 4.

The present invention includes heat transfer methods comprising Heat Transfer Method 1 in which the refrigerant is Refrigerant 8 and the sequestration material is Sequestration Material 1.

The present invention includes heat transfer methods comprising Heat Transfer Method 1 in which the refrigerant is Refrigerant 8 and the sequestration material is Sequestration Material 2.

The present invention includes heat transfer methods comprising Heat Transfer Method 1 in which the refrigerant is Refrigerant 8 and the sequestration material is Sequestration Material 3.

The present invention includes heat transfer methods comprising Heat Transfer Method 1 in which the refrigerant is Refrigerant 8 and the sequestration material is Sequestration Material 4.

A Heat Transfer Method 1 according to each of the preceeding paragraphs in which said exposing temperature is above about 20° C.

A Heat Transfer Method 1 according to each of the preceeding paragraphs in which said exposing temperature is above about 30° C.

In a preferred embodiment it is preferred that a moisture-removing material, and preferably a moisture-removing molecular sieve, is in the flow of refrigerant at a point downstream of each of the other sequestration materials. This preferred arrangement can be achieved by placing a separate moisture-removing material, including particularly a molecular sieve, at a point downstream in the refrigerant of one sequestration material but upstream of another sequestration material, or by locating the moisture-removing material, including particularly a molecular sieve, downstream of all the other sequestration materials.

In other aspects of the present invention, Sequestration Material 1 is configured such that each of the at least two materials are included together in a filter element. As the term is used herein, "filter element" refers to any device, system, article or container in which each of the sequestration materials are located in close physical proximity, and preferably at essentially the same location within the system.

In other aspects of the present invention, Sequestration Material 1 is configured such that each of the at least two materials are included together in a solid core. As the term is used herein, "solid core" refers to relatively porous solid which contains and/or has embedded therein two or more of sequestration materials such that such materials are accessible to fluids passing through said any solid core.

In preferred embodiments the one or more sequestration materials are substantially homogeneously distributed throughout the solid core.

In preferred embodiments, the solid core of the present invention is included in or comprises a filter element.

In other aspects of the present invention, Sequestration Material 1 is configured such that each of the at least two materials are included in a solid core.

In other aspects of the present invention, Sequestration Material 2 is configured such that each of the at least two materials are included together in a filter element.

In other aspects of the present invention, Sequestration Material 2 is configured such that all of materials are included in a solid core.

In other aspects of the present invention, Sequestration Material 3 is configured such that each of the at least two materials are included together in a filter element.

In other aspects of the present invention, Sequestration Material 3 is configured such that all of materials are included in a solid core.

In other aspects of the present invention, Sequestration Material 4 is configured such that each of the at least two materials are included together in a filter element.

In other aspects of the present invention, Sequestration Material 4 is configured such that all of materials are included in a solid core.

The present invention includes heat transfer methods according to Heat Transfer Method 1 in which the refrigerant is Refrigerant 1 and in which the sequestration material is Sequestration Material 1 located in a filter element and/or in a solid core.

The present invention includes heat transfer methods according to Heat Transfer Method 1 in which the refrigerant is Refrigerant 1 and in which the sequestration material is Sequestration Material 2 located in a filter element and/or in a solid core.

The present invention includes heat transfer methods according to Heat Transfer Method 1 in which the refrigerant is Refrigerant 1 and in which the sequestration material is Sequestration Material 3 located in a filter element and/or in a solid core.

The present invention includes heat transfer methods according to Heat Transfer Method 1 in which the refrigerant is Refrigerant 1 and in which the sequestration material is Sequestration Material 4 located in a filter element and/or in a solid core.

The present invention includes heat transfer methods according to Heat Transfer Method 1 in which the refrigerant is Refrigerant 2 and in which the sequestration material is Sequestration Material 1 located in a filter element and/or in a solid core.

The present invention includes heat transfer methods according to Heat Transfer Method 1 in which the refrigerant is Refrigerant 2 and in which the sequestration material is Sequestration Material 2 located in a filter element and/or in a solid core.

The present invention includes heat transfer methods according to Heat Transfer Method 1 in which the refrigerant is Refrigerant 2 and in which the sequestration material is Sequestration Material 3 located in a filter element and/or in a solid core.

The present invention includes heat transfer methods according to Heat Transfer Method 1 in which the refrigerant is Refrigerant 2 and in which the sequestration material is Sequestration Material 4 located in a filter element and/or in a solid core.

The present invention includes heat transfer methods according to Heat Transfer Method 1 in which the refrigerant is Refrigerant 3 and in which the sequestration material is Sequestration Material 1 located in a filter element and/or in a solid core.

The present invention includes heat transfer methods according to Heat Transfer Method 1 in which the refrigerant is Refrigerant 3 and in which the sequestration material is Sequestration Material 2 located in a filter element and/or in a solid core.

The present invention includes heat transfer methods according to Heat Transfer Method 1 in which the refrigerant is Refrigerant 3 and in which the sequestration material is Sequestration Material 3 located in a filter element and/or in a solid core.

The present invention includes heat transfer methods according to Heat Transfer Method 1 in which the refrigerant is Refrigerant 3 and in which the sequestration material is Sequestration Material 4 located in a filter element and/or in a solid core.

The present invention includes heat transfer methods according to Heat Transfer Method 1 in which the refrigerant is Refrigerant 4 and in which the sequestration material is Sequestration Material 1 located in a filter element and/or in a solid core.

The present invention includes heat transfer methods according to Heat Transfer Method 1 in which the refrigerant is Refrigerant 4 and in which the sequestration material is Sequestration Material 2 located in a filter element and/or in a solid core.

The present invention includes heat transfer methods according to Heat Transfer Method 1 in which the refrigerant is Refrigerant 4 and in which the sequestration material is Sequestration Material 3 located in a filter element and/or in a solid core.

The present invention includes heat transfer methods according to Heat Transfer Method 1 in which the refrigerant is Refrigerant 4 and in which the sequestration material is Sequestration Material 4 located in a filter element and/or in a solid core.

The present invention includes heat transfer methods according to Heat Transfer Method 1 in which the refrigerant is Refrigerant 5 and in which the sequestration material is Sequestration Material 1 located in a filter element and/or in a solid core.

The present invention includes heat transfer methods according to Heat Transfer Method 1 in which the refrigerant is Refrigerant 5 and in which the sequestration material is Sequestration Material 2 located in a filter element and/or in a solid core.

The present invention includes heat transfer methods according to Heat Transfer Method 1 in which the refrigerant is Refrigerant 5 and in which the sequestration material is Sequestration Material 3 located in a filter element and/or in a solid core.

The present invention includes heat transfer methods according to Heat Transfer Method 1 in which the refrigerant is Refrigerant 5 and in which the sequestration material is Sequestration Material 4 located in a filter element and/or in a solid core.

The present invention includes heat transfer methods according to Heat Transfer Method 1 in which the refrigerant is Refrigerant 6 and in which the sequestration material is Sequestration Material 1 located in a filter element and/or in a solid core.

The present invention includes heat transfer methods according to Heat Transfer Method 1 in which the refrigerant is Refrigerant 6 and in which the sequestration material is Sequestration Material 2 located in a filter element and/or in a solid core.

The present invention includes heat transfer methods according to Heat Transfer Method 1 in which the refrigerant is Refrigerant 6 and in which the sequestration material is Sequestration Material 3 located in a filter element and/or in a solid core.

The present invention includes heat transfer methods according to Heat Transfer Method 1 in which the refrigerant is Refrigerant 6 and in which the sequestration material is Sequestration Material 4 located in a filter element and/or in a solid core.

The present invention includes heat transfer methods according to Heat Transfer Method 1 in which the refrigerant is Refrigerant 7 and in which the sequestration material is Sequestration Material 1 located in a filter element and/or in a solid core.

The present invention includes heat transfer methods according to Heat Transfer Method 1 in which the refrigerant is Refrigerant 7 and in which the sequestration material is Sequestration Material 2 located in a filter element and/or in a solid core.

The present invention includes heat transfer methods according to Heat Transfer Method 1 in which the refrigerant is Refrigerant 7 and in which the sequestration material is Sequestration Material 3 located in a filter element and/or in a solid core.

The present invention includes heat transfer methods according to Heat Transfer Method 1 in which the refrigerant is Refrigerant 7 and in which the sequestration material is Sequestration Material 4 located in a filter element and/or in a solid core.

The present invention includes heat transfer methods according to Heat Transfer Method 1 in which the refrigerant is Refrigerant 8 and in which the sequestration material is Sequestration Material 1 located in a filter element and/or in a solid core.

The present invention includes heat transfer methods according to Heat Transfer Method 1 in which the refrigerant is Refrigerant 8 and in which the sequestration material is Sequestration Material 2 located in a filter element and/or in a solid core.

The present invention includes heat transfer methods according to Heat Transfer Method 1 in which the refrigerant is Refrigerant 8 and in which the sequestration material is Sequestration Material 3 located in a filter element and/or in a solid core.

The present invention includes heat transfer methods according to Heat Transfer Method 1 in which the refrigerant is Refrigerant 8 and in which the sequestration material is Sequestration Material 4 located in a filter element and/or in a solid core.

he present invention also includes methods for transferring heat of the type comprising evaporating refrigerant liquid and condensing refrigerant vapor in a plurality of repeating cycles, said method comprising:
  (a) providing Refrigerant 1; and
  (b) exposing at least a portion Refrigerant 1 in at least a portion of said plurality of said repeating cycles to a Sequestration Material 1 in a filter element or in a solid core The present invention also includes methods for transferring heat of the type comprising evaporating refrigerant liquid and condensing refrigerant vapor in a plurality of repeating cycles, said method comprising:
 (a) providing a refrigerant; and
 (b) exposing at least a portion the refrigerant in at least a portion of said plurality of said repeating cycles to a sequestration material of the present invention. For the purposes of convenience, methods according to this paragraph are referred to herein as Heat Transfer Method 2

The present invention includes heat transfer methods according to Heat Transfer Method 2 in which the refrigerant is Refrigerant 1 and in which the sequestration material is Sequestration Material 1 located in a filter element and/or in a solid core.

The present invention includes heat transfer methods according to Heat Transfer Method 2 in which the refrigerant is Refrigerant 1 and in which the sequestration material is Sequestration Material 2 located in a filter element and/or in a solid core.

The present invention includes heat transfer methods according to Heat Transfer Method 2 in which the refrigerant is Refrigerant 1 and in which the sequestration material is Sequestration Material 3 located in a filter element and/or in a solid core.

The present invention includes heat transfer methods according to Heat Transfer Method 2 in which the refrigerant is Refrigerant 1 and in which the sequestration material is Sequestration Material 4 located in a filter element and/or in a solid core.

The present invention includes heat transfer methods according to Heat Transfer Method 2 in which the refrigerant is Refrigerant 2 and in which the sequestration material is Sequestration Material 1 located in a filter element and/or in a solid core.

The present invention includes heat transfer methods according to Heat Transfer Method 2 in which the refrigerant is Refrigerant 2 and in which the sequestration material is Sequestration Material 2 located in a filter element and/or in a solid core.

The present invention includes heat transfer methods according to Heat Transfer Method 2 in which the refrigerant is Refrigerant 2 and in which the sequestration material is Sequestration Material 3 located in a filter element and/or in a solid core.

The present invention includes heat transfer methods according to Heat Transfer Method 2 in which the refrigerant is Refrigerant 2 and in which the sequestration material is Sequestration Material 4 located in a filter element and/or in a solid core.

The present invention includes heat transfer methods according to Heat Transfer Method 2 in which the refrigerant is Refrigerant 3 and in which the sequestration material is Sequestration Material 1 located in a filter element and/or in a solid core.

The present invention includes heat transfer methods according to Heat Transfer Method 2 in which the refrigerant is Refrigerant 3 and in which the sequestration material is Sequestration Material 2 located in a filter element and/or in a solid core.

The present invention includes heat transfer methods according to Heat Transfer Method 2 in which the refrigerant is Refrigerant 3 and in which the sequestration material is Sequestration Material 3 located in a filter element and/or in a solid core.

The present invention includes heat transfer methods according to Heat Transfer Method 2 in which the refrigerant is Refrigerant 3 and in which the sequestration material is Sequestration Material 4 located in a filter element and/or in a solid core.

The present invention includes heat transfer methods according to Heat Transfer Method 2 in which the refrigerant is Refrigerant 4 and in which the sequestration material is Sequestration Material 1 located in a filter element and/or in a solid core.

The present invention includes heat transfer methods according to Heat Transfer Method 2 in which the refrigerant is Refrigerant 4 and in which the sequestration material is Sequestration Material 2 located in a filter element and/or in a solid core.

The present invention includes heat transfer methods according to Heat Transfer Method 2 in which the refrigerant is Refrigerant 4 and in which the sequestration material is Sequestration Material 3 located in a filter element and/or in a solid core.

The present invention includes heat transfer methods according to Heat Transfer Method 2 in which the refrigerant is Refrigerant 4 and in which the sequestration material is Sequestration Material 4 located in a filter element and/or in a solid core.

The present invention includes heat transfer methods according to Heat Transfer Method 2 in which the refrigerant is Refrigerant 5 and in which the sequestration material is Sequestration Material 1 located in a filter element and/or in a solid core.

The present invention includes heat transfer methods according to Heat Transfer Method 2 in which the refrigerant is Refrigerant 5 and in which the sequestration material is Sequestration Material 2 located in a filter element and/or in a solid core.

The present invention includes heat transfer methods according to Heat Transfer Method 2 in which the refrigerant is Refrigerant 5 and in which the sequestration material is Sequestration Material 3 located in a filter element and/or in a solid core.

The present invention includes heat transfer methods according to Heat Transfer Method 2 in which the refrigerant is Refrigerant 5 and in which the sequestration material is Sequestration Material 4 located in a filter element and/or in a solid core.

The present invention includes heat transfer methods according to Heat Transfer Method 2 in which the refrigerant is Refrigerant 6 and in which the sequestration material is Sequestration Material 1 located in a filter element and/or in a solid core.

The present invention includes heat transfer methods according to Heat Transfer Method 2 in which the refrigerant is Refrigerant 6 and in which the sequestration material is Sequestration Material 2 located in a filter element and/or in a solid core.

The present invention includes heat transfer methods according to Heat Transfer Method 2 in which the refrigerant is Refrigerant 6 and in which the sequestration material is Sequestration Material 3 located in a filter element and/or in a solid core.

The present invention includes heat transfer methods according to Heat Transfer Method 2 in which the refrigerant is Refrigerant 6 and in which the sequestration material is Sequestration Material 4 located in a filter element and/or in a solid core.

The present invention includes heat transfer methods according to Heat Transfer Method 2 in which the refrigerant is Refrigerant 7 and in which the sequestration material is Sequestration Material 1 located in a filter element and/or in a solid core.

The present invention includes heat transfer methods according to Heat Transfer Method 2 in which the refrigerant is Refrigerant 7 and in which the sequestration material is Sequestration Material 2 located in a filter element and/or in a solid core.

The present invention includes heat transfer methods according to Heat Transfer Method 2 in which the refrigerant is Refrigerant 7 and in which the sequestration material is Sequestration Material 3 located in a filter element and/or in a solid core.

The present invention includes heat transfer methods according to Heat Transfer Method 2 in which the refrigerant is Refrigerant 7 and in which the sequestration material is Sequestration Material 4 located in a filter element and/or in a solid core.

The present invention includes heat transfer methods according to Heat Transfer Method 2 in which the refrigerant is Refrigerant 8 and in which the sequestration material is Sequestration Material 1 located in a filter element and/or in a solid core.

The present invention includes heat transfer methods according to Heat Transfer Method 2 in which the refrigerant is Refrigerant 8 and in which the sequestration material is Sequestration Material 2 located in a filter element and/or in a solid core.

The present invention includes heat transfer methods according to Heat Transfer Method 2 in which the refrigerant is Refrigerant 8 and in which the sequestration material is Sequestration Material 3 located in a filter element and/or in a solid core.

The present invention includes heat transfer methods according to Heat Transfer Method 2 in which the refrigerant is Refrigerant 8 and in which the sequestration material is Sequestration Material 4 located in a filter element and/or in a solid core.

The present invention includes a refrigeration system comprising:
(a) refrigerant of the present invention circulating in said system, and
(b) a sequestration material in contact with at least a portion of said refrigerant and/or said lubricant. Refrigerant systems according to the present paragraph are referred to herein as Refrigerant System 1.

The present invention includes Refrigerant System 1 in which the refrigerant is Refrigerant 1 and the sequestration material is Sequestration Material 1.

The present invention includes Refrigerant System 1 in which the refrigerant is Refrigerant 1 and the sequestration material is Sequestration Material 2.

The present invention includes Refrigerant System 1 in which the refrigerant is Refrigerant 1 and the sequestration material is Sequestration Material 3.

The present invention includes Refrigerant System 1 in which the refrigerant is Refrigerant 1 and the sequestration material is Sequestration Material 4.

The present invention includes Refrigerant System 1 in which the refrigerant is Refrigerant 2 and the sequestration material is Sequestration Material 1.

The present invention includes Refrigerant System 1 in which the refrigerant is Refrigerant 2 and the sequestration material is Sequestration Material 2.

The present invention includes Refrigerant System 1 in which the refrigerant is Refrigerant 2 and the sequestration material is Sequestration Material 3.

The present invention includes Refrigerant System 1 in which the refrigerant is Refrigerant 2 and the sequestration material is Sequestration Material 4.

The present invention includes Refrigerant System 1 in which the refrigerant is Refrigerant 3 and the sequestration material is Sequestration Material 1.

The present invention includes Refrigerant System 1 in which the refrigerant is Refrigerant 3 and the sequestration material is Sequestration Material 2.

The present invention includes Refrigerant System 1 in which the refrigerant is Refrigerant 3 and the sequestration material is Sequestration Material 3.

The present invention includes Refrigerant System 1 in which the refrigerant is Refrigerant 3 and the sequestration material is Sequestration Material 4.

The present invention includes Refrigerant System 1 in which the refrigerant is Refrigerant 4 and the sequestration material is Sequestration Material 1.

The present invention includes Refrigerant System 1 in which the refrigerant is Refrigerant 4 and the sequestration material is Sequestration Material 2.

The present invention includes Refrigerant System 1 in which the refrigerant is Refrigerant 4 and the sequestration material is Sequestration Material 3.

The present invention includes Refrigerant System 1 in which the refrigerant is Refrigerant 4 and the sequestration material is Sequestration Material 4.

The present invention includes Refrigerant System 1 in which the refrigerant is Refrigerant 5 and the sequestration material is Sequestration Material 1.

The present invention includes Refrigerant System 1 in which the refrigerant is Refrigerant 5 and the sequestration material is Sequestration Material 2.

The present invention includes Refrigerant System 1 in which the refrigerant is Refrigerant 5 and the sequestration material is Sequestration Material 3.

The present invention includes Refrigerant System 1 in which the refrigerant is Refrigerant 5 and the sequestration material is Sequestration Material 4.

The present invention includes Refrigerant System 1 in which the refrigerant is Refrigerant 6 and the sequestration material is Sequestration Material 1.

The present invention includes Refrigerant System 1 in which the refrigerant is Refrigerant 6 and the sequestration material is Sequestration Material 2.

The present invention includes Refrigerant System 1 in which the refrigerant is Refrigerant 6 and the sequestration material is Sequestration Material 3.

The present invention includes Refrigerant System 1 in which the refrigerant is Refrigerant 6 and the sequestration material is Sequestration Material 4.

The present invention includes Refrigerant System 1 in which the refrigerant is Refrigerant 7 and the sequestration material is Sequestration Material 1.

The present invention includes Refrigerant System 1 in which the refrigerant is Refrigerant 7 and the sequestration material is Sequestration Material 2.

The present invention includes Refrigerant System 1 in which the refrigerant is Refrigerant 7 and the sequestration material is Sequestration Material 3.

The present invention includes Refrigerant System 1 in which the refrigerant is Refrigerant 7 and the sequestration material is Sequestration Material 4.

The present invention includes Refrigerant System 1 in which the refrigerant is Refrigerant 8 and the sequestration material is Sequestration Material 1.

The present invention includes Refrigerant System 1 in which the refrigerant is Refrigerant 8 and the sequestration material is Sequestration Material 2.

The present invention includes Refrigerant System 1 in which the refrigerant is Refrigerant 8 and the sequestration material is Sequestration Material 3.

The present invention includes Refrigerant System 1 in which the refrigerant is Refrigerant 8 and the sequestration material is Sequestration Material 4.

The present invention also includes a heat transfer refrigeration system comprising a heat transfer composition circulating in the heat transfer system that has been installed and in operation for a period of at least about 1 year, said heat transfer composition comprising a lubricant and a refrigerant according to the present invention and said system comprising a sequestration material of the present invention and in which the refrigerant and/or the lubricant has an iodide content of not greater than about 1100 ppm based on the weight of refrigerant and/or about 1100 ppm based on the weight of the lubricant. Heat transfer compositions according to this paragraph are referred to herein as Heat Transfer System 1.

As used here, the term "installed and in operation" refers to new installations and refurbished installations which have been installed or modified according to the present invention, which have been in regular operation. As used herein, the term "regular operation" includes time periods in which the system would normally be shut down for maintenance and/or repairs and during other periods during which the system would normally not be operating but would be considered in service.

The present invention includes Heat Transfer System 1 in which the refrigerant is Refrigerant 1, the lubricant comprises POE, and the sequestration material is Sequestration Material 1.

The present invention includes Heat Transfer System 1 in which the refrigerant is Refrigerant 1, the lubricant comprises POE, and the sequestration material is Sequestration Material 2.

The present invention includes Heat Transfer System 1 in which the refrigerant is Refrigerant 1, the lubricant comprises POE, and the sequestration material is Sequestration Material 3.

The present invention includes Heat Transfer System 1 in which the refrigerant is Refrigerant 1, the lubricant comprises POE, and the sequestration material is Sequestration Material 4.

The present invention includes Heat Transfer System 1 in which the refrigerant is Refrigerant 2, the lubricant comprises POE, and the sequestration material is Sequestration Material 1.

The present invention includes Heat Transfer System 1 in which the refrigerant is Refrigerant 2, the lubricant comprises POE, and the sequestration material is Sequestration Material 2.

The present invention includes Heat Transfer System 1 in which the refrigerant is Refrigerant 2, the lubricant comprises POE, and the sequestration material is Sequestration Material 3.

The present invention includes Heat Transfer System 1 in which the refrigerant is Refrigerant 2, the lubricant comprises POE, and the sequestration material is Sequestration Material 4.

The present invention includes Heat Transfer System 1 in which the refrigerant is Refrigerant 3, the lubricant comprises POE, and the sequestration material is Sequestration Material 1.

The present invention includes Heat Transfer System 1 in which the refrigerant is Refrigerant 3, the lubricant comprises POE, and the sequestration material is Sequestration Material 2.

The present invention includes Heat Transfer System 1 in which the refrigerant is Refrigerant 3, the lubricant comprises POE, and the sequestration material is Sequestration Material 3.

The present invention includes Heat Transfer System 1 in which the refrigerant is Refrigerant 3, the lubricant comprises POE, and the sequestration material is Sequestration Material 4.

The present invention includes Heat Transfer System 1 in which the refrigerant is Refrigerant 4, the lubricant comprises POE, and the sequestration material is Sequestration Material 1.

The present invention includes Heat Transfer System 1 in which the refrigerant is Refrigerant 4, the lubricant comprises POE, and the sequestration material is Sequestration Material 2.

The present invention includes Heat Transfer System 1 in which the refrigerant is Refrigerant 4, the lubricant comprises POE, and the sequestration material is Sequestration Material 3.

The present invention includes Heat Transfer System 1 in which the refrigerant is Refrigerant 4, the lubricant comprises POE, and the sequestration material is Sequestration Material 4.

The present invention includes Heat Transfer System 1 in which the refrigerant is Refrigerant 5, the lubricant comprises POE, and the sequestration material is Sequestration Material 1.

The present invention includes Heat Transfer System 1 in which the refrigerant is Refrigerant 5, the lubricant comprises POE, and the sequestration material is Sequestration Material 2.

The present invention includes Heat Transfer System 1 in which the refrigerant is Refrigerant 5, the lubricant comprises POE, and the sequestration material is Sequestration Material 3.

The present invention includes Heat Transfer System 1 in which the refrigerant is Refrigerant 5, the lubricant comprises POE, and the sequestration material is Sequestration Material 4.

The present invention includes Heat Transfer System 1 in which the refrigerant is Refrigerant 6, the lubricant comprises POE, and the sequestration material is Sequestration Material 1.

The present invention includes Heat Transfer System 1 in which the refrigerant is Refrigerant 6, the lubricant comprises POE, and the sequestration material is Sequestration Material 2.

The present invention includes Heat Transfer System 1 in which the refrigerant is Refrigerant 6, the lubricant comprises POE, and the sequestration material is Sequestration Material 3.

The present invention includes Heat Transfer System 1 in which the refrigerant is Refrigerant 6, the lubricant comprises POE, and the sequestration material is Sequestration Material 4.

The present invention includes Heat Transfer System 1 in which the refrigerant is Refrigerant 7, the lubricant comprises POE, and the sequestration material is Sequestration Material 1.

The present invention includes Heat Transfer System 1 in which the refrigerant is Refrigerant 7, the lubricant comprises POE, and the sequestration material is Sequestration Material 2.

The present invention includes Heat Transfer System 1 in which the refrigerant is Refrigerant 7, the lubricant comprises POE, and the sequestration material is Sequestration Material 3.

The present invention includes Heat Transfer System 1 in which the refrigerant is Refrigerant 7, the lubricant comprises POE, and the sequestration material is Sequestration Material 4.

The present invention includes Heat Transfer System 1 in which the refrigerant is Refrigerant 8, the lubricant comprises POE, and the sequestration material is Sequestration Material 1.

The present invention includes Heat Transfer System 1 in which the refrigerant is Refrigerant 8, the lubricant comprises POE, and the sequestration material is Sequestration Material 2.

The present invention includes Heat Transfer System 1 in which the refrigerant is Refrigerant 8, the lubricant comprises POE, and the sequestration material is Sequestration Material 3.

The present invention includes Heat Transfer System 1 in which the refrigerant is Refrigerant 8, the lubricant comprises POE, and the sequestration material is Sequestration Material 4.

A Heat Transfer System 1 according to each of the preceeding paragraphs which have been installed and in operation for a period of at least about 2 years.

A Heat Transfer System 1 according to each of the preceeding paragraphs which have been installed and in operation for a period of at least about 5 years.

A Heat Transfer System 1 according to each of the preceding paragraphs in which the refrigerant and/or the lubricant has an fluoride content of not greater than about 500 ppm based on the weight of refrigerant and/or 500 ppm based on the weight of the lubricant).

The preferred heat transfer compositions of the invention are preferably non-flammable. As used herein, the term "non-flammable" refers to compounds or compositions which are determined to be non-flammable in accordance with ASTM standard E-681-2001 at conditions described in ASHRAE Standard 34-2013 and described in Appendix B1 to ASHRAE Standard 34-2013.

DETAILED DESCRIPTION OF PREFERRED EMBODIMENTS

The Methods

As mentioned above, the present invention includes methods for transferring heat comprising evaporating refrigerant liquid and condensing refrigerant vapor in a plurality of repeating cycles. The methods aspects of the present invention thus encompass broadly any and all such methods, including vapor compression refrigeration, absorption refrigeration, Rankine Cycles and heat pipes. In each of these methods, the refrigerant travels or is transported through a cycle that involves the refrigerant being exposed to a variety of temperatures, pressures, materials of construction and other components of the heat transfer composition, such as for example lubricants in the case of compression refrigeration systems which include lubricated compressors. As a result of the exposure to such conditions, the refrigerant of the present invention which includes at least 5% by weight of lower alkyl iodoflurocarbon, and preferably CF3I, tends to produce degradation products, such as iodide ($I^-$), iodine ($I_2$) and fluoride ($F^-$), which can negatively impact the reliability of the heat transfer system, and/or the stability of any lubricant present in the system.

Accordingly, preferred embodiments of the present methods include the step of exposing at least a portion of the refrigerant, and preferably substantially all of the refrigerant, and even more preferably all of refrigerant circulating in the system, and even more preferably substantially all of the heat transfer composition circulating in the system, to a sequestration material of the present invention. Applicants have found that unexpected advantages can be achieved in such methods by conducting said exposing step so as to a have an exposing temperature of at least about 10 C, more preferably at least about 20 C, or preferably at least about 30° C. Although it is contemplated that the exposing step can involve the temperature of the refrigerant being at least about 10 C, 20 C or 30 C, or the temperature of the sequestration material being at least about 10 C, 20 C or 30 C, it is generally preferred that both the refrigerant and the sequestration material are at a temperature of at least about 10c, 20 C or 30 C, during at least a substantial portion, and preferably during substantially all of, the time that the refrigerant is in contact with the sequestration material for a given exposing step.

Preferred embodiments of the present methods also include the sequestration material comprising a combination of at least: i. activated alumina; ii. a zeolite molecular sieve comprising copper, silver, lead or a combination thereof; iii. an anion exchange resin, and iv. a moisture-removing material, preferably a moisture-removing molecular sieve. Applicants have found that this combination produces unexpected advantages, even when the exposing temperature is less than about 10 C, 20 C or 30 C.

In preferred embodiments of present invention the heat transfer methods comprise creating a stream or flow or body of refrigerant fluid and/or creating a stream or flow or body of refrigerant fluid, and the exposing step of the present invention comprises in such preferred embodiments locating in one or more of said streams or flows or bodies an amount or volume, and preferably a fixed volume, of a sequestration material of the present invention such that the refrigerant and/or the lubricant flows over, flows over, through or otherwise is in intimate contact with the sequestration material. In certain preferred of such embodiments, the stream or flow in which the sequestration material is located comprises a stream or flow that is part of the refrigeration cycle. For example, and as explained more fully herein elsewhere, the exposing step may comprising placing a fixed volume of sequestration material in the compressor discharge stream of a vapor compression system, preferably wherein said compressor discharge temperature is at least about 10 C, more preferably at least about 20 C, or preferably at least about 30 C. In other embodiments it is contemplated that the exposing step comprises taking a slip or side stream of the refrigerant circulating in the heat transfer cycle and exposing that slip or side stream to the sequestration material, preferably where the slip or side stream is at a temperature of at least about 10 C, more preferably 20 C and even more preferably at least about 30 C, and then returning the slip or side stream to the circulating refrigerant, either downstream from where it was drawn, upstream from where it was drawn, or returning a portion downstream and a portion upstream. In other or supplemental embodiments, the slip or side stream may be taken from a refrigerant stream that is less than about 10 C, or about 20 C, or less than 30 C, and the slip or side stream is heated to above about 10 C, or about 20 C, or above about 30 C, and then exposed to the sequestration material and/or the sequestration material is maintained at a temperature above about 10 C, or 20 C or above about 30 C. In yet other embodiments, the exposing step may comprises dissolving or suspending the sequestration material, or locating the sequestration material, in at least a part of the stream or flow of refrigerant and/or lubricant that is circulating in the refrigeration cycle or a subportion of the refrigeration cycle. In such cases the sequestration material can be a separate, fixed volume or it can not be a separate fixed volume but instead travels with the refrigerant and/or during at least a portion of the refrigerant cycle and/or lubricant cycle, and preferably during a portion of the cycle in which the refrigerant temperature or the lubricant temperature is at least about 10 C, or about 20 C, more preferably at least about 30 C.

In embodiments of the invention in which the heat transfer system includes an oil separator, one or more of the sequestration materials comprises; i. activated alumina; ii. a zeolite molecular sieve comprising copper, silver, lead or a combination thereof; iii. an anion exchange resin, and iv. a moisture-removing material, preferably a moisture-removing molecular sieve, and in preferred embodiments all of these materials together, can be located inside the oil separator, or in some cases outside but downstream of the oil separator, such that the liquid lubricant contacts the sequestration material(s), as shown in FIG. 5 hereof. The present invention also includes one or more of the materials being located in the refrigerant liquid which exits the condenser.

For methods of the present invention which include the step of compressing refrigerant vapor according to the present invention and subsequently condensing the compressed refrigerant stream, at least a portion of, and in preferred embodiments substantially all of the sequestration material is present in the compressor discharge refrigerant stream, that is, in the discharge line, and preferably the exposing temperature in such location is from about 70° C. to about 140° C. In other embodiments, at least a portion of, and in preferred embodiments substantially all of, the sequestration material is present in the liquid refrigerant leaving the condenser, and the temperatures to which the sequestration material is exposed may be from about 10° C. to about 80° C. In other embodiments, at least a portion of, and in preferred embodiments substantially all of, the sequestration material is present in the suction line of the compressor, and the temperatures in such a case to which the sequestration material is exposed may be from about −30° C. to about 30° C.

Thus, in preferred embodiments, the exposing step is carried by out at a temperature of from about 50° C. to about 140° C., more preferably from about 70° C. to about 140° C.

In preferred embodiments, the exposing step is carried by out at a temperature of from about 20° C. to about 80° C. or from about −30° C. to about 20° C., and in such embodiments the sequestration material preferably comprises a combination of:
  i. activated alumina
  ii. a zeolite molecular sieve comprising copper, silver, lead or a combination thereof,
  iii. an anion exchange resin, and
  iv. a moisture-removing material, preferably a moisture-removing molecular sieve.

The preferred heat transfer compositions and sequestration materials for use in accordance with the method aspects of the present invention are described in detail below.

Sequestration Material

The sequestration material may comprise one or more of: a) copper or a copper alloy; b) a molecular sieve (preferably a zeolite) comprising copper, silver, lead or a combination thereof, c) an anion exchange resin, d) moisture removal materials, e) and activated alumina, or a combination of any two or more of these materials a. Copper/Copper Alloy Sequestration Material The sequestration material may be copper, or a copper alloy, preferably copper.

The copper alloy may comprise, in addition to copper, one or more further metals, such as tin, aluminium, silicon, nickel or a combination thereof. Alternatively, or in addition, the copper alloy may comprise one or more non-metal elements, e.g. carbon, nitrogen, silicon, oxygen or a combination thereof.

It will be appreciated that the copper alloy may comprise varying amounts of copper.

For example, the copper alloy may comprise at least about 5 wt %, at least about 15 wt %, at least about 30 wt %, at least about 50 wt %, at least about 70 wt % or at least about 90 wt % of copper, based on the total weight of the copper alloy. It will also be appreciated that the copper alloy may comprise from about 5 wt % to about 95 wt %, from about 10 wt % to about 90 wt %, from about 15 wt % to about 85 wt %, from about 20 wt % to about 80 wt %, form about 30 wt % to about 70 wt %, or from about 40 wt % to about 60 wt % of copper, based on the total weight of the copper alloy.

Alternatively, copper may be used as a sequestration material. The copper metal may contain impurity levels of other elements or compounds. For example, the copper metal may contain at least about 99 wt %, more preferably at least about 99.5 wt %, more preferably at least about 99.9 wt % of elemental copper.

The copper or copper alloy may be in any form which allows the refrigerant to contact the surface of the copper or copper alloy. Preferably, the form of the copper or copper alloy is selected to maximize the surface area of the copper or copper alloy (i.e. to maximize the area which is in contact with the refrigerant).

For example, the metal may be in the form of a mesh, wool, spheres, cones, cylinders etc. The term "sphere" refers to a three dimensional shape where the difference between the largest diameter and the smallest diameter is about 10% or less of the largest diameter.

The copper or copper alloy may have a BET surface area of at least about 10 $m^2/g$, at least about 20 $m^2/g$, at least about 30 $m^2/g$, at least about 40 $m^2/g$ or at least about 50 $m^2/g$. The BET-surface area may be measured in accordance with ASTM D6556-10.

When the sequestration material comprises copper or a copper alloy, the BET surface area of the copper or copper alloy may be from about 0.01 to about 1.5 $m^2$ per kg of refrigerant, preferably from about 0.02 to about 0.5 $m^2$ per kg of refrigerant.

For example, the copper or copper alloy may have a surface area of about 0.08 $m^2$ per kg of refrigerant.

b. Zeolite Molecular Sieve Sequestration Material

The sequestration material may comprise a zeolite molecular sieve (. The zeolite molecular sieve comprises copper, silver, lead or a combination thereof, preferably at least silver.

In preferred embodiments, the zeolite molecular sieve contains an amount of metal, and preferably in certain embodiments silver, of from about 1% to about 30% by weight, or preferably from about 5% to about 20% by weight, based on the total weight of the zeolite.

The metal (i.e. copper, silver and/or lead) may be present in a single oxidation state, or in a variety of oxidation states (e.g. a copper zeolite may comprise both Cu(I) and Cu(II)).

The zeolite molecular sieve may comprise metals other than silver, lead, and/or copper.

The zeolite may have openings which have a size across their largest dimension of from about 5 to 40 Å. For example, the zeolite may have openings which have a size across their largest dimension of about 35 Å or less. Preferably, the zeolite has openings which have a size across their largest dimension of from about 15 to about 35 Å. Zeolite such as IONSIV D7310-C has activated sites that applicants have found to effectively remove specific decomposition products in accordance with the present invention.

When the sequestration material comprises a zeolite molecular sieve comprising copper, silver, lead or a combination thereof, the molecular sieve (e.g. zeolite) may be present in an amount of from about 1 wt % to about 30 wt %, such as from about 2 wt % to about 25 wt % relative to the total amount of molecular sieve (e.g. zeolite), refrigerant and lubricant (if present) in heat transfer system being treated In preferred embodiments, the sequestration material comprises a zeolite molecular sieve comprising silver, and in such embodiments the molecular sieve may be present in an amount of at least 5% parts by weight (pbw), preferably from about 5 pbw to about 30 pbw, or from about 5 pbw to about 20 pbw, per 100 parts by weight of lubricant (pphl) based on the total amount of molecular sieve (e.g. zeolite) and lubricant in the heat transfer system being treated. The preferred embodiments as described in this paragraph have been found to have exceptional ability to remove fluoride from heat transfer compositions as described herein. Furthermore in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprising silver, and in such embodiments the molecular sieve (e.g. zeolite) may be present in an amount of at least 10 pphl, preferably from about 10 pphl to about 30 pphl, or from about 10 pphl to about 20 pphl by weight relative to the total amount of molecular sieve (e.g. zeolite), and lubricant in the heat transfer system being treated. The preferred embodiments as described in this paragraph have been found to have exceptional ability to remove iodide from heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprises silver, and in such embodiments the molecular sieve may be present in an amount of at least pphl, preferably from about 15 pphl to about 30 pphl, or from about 15 pphl to about 20 pphl by weightrelative to the total amount of molecular sieve, and lubricant in the heat transfer system being treated. The preferred embodiments as described in this paragraph have been found to have exceptional ability to reduce TAN levels in the heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

Preferably, the zeolite molecular sieve is present in an amount of at least about 15 pphl, or at least about 18 pphl relative to the total amount of molecular sieve and lubricant in the system. Therefore, the molecular sieve may be present in an amount of from about 15 pphl to about 30 pphl, or from about 18 pphl to about 25 pphl relative to the total amount of molecular sieve and lubricant present in the system.

It will be appreciated that the zeolite may be present in an amount of about 5 pphl or about 21 pphl relative to the total amount of molecular sieve, and lubricant in the system.

The amount of zeolite molecular sieve described herein refers to the dry weight of the molecular sieve. As used herein, the term "dry weight" of the sequestration materials means that the material has 50 ppm or less of moisture.

c. Anion Exchange Resins

The sequestration material may comprise an anion exchange resin.

Preferably, the anion exchange resin is a strongly basic anion exchange resin. The strongly basic anion exchange resin may be a type 1 resin or a type 2 resin. Preferably, the anion exchange resin is a type 1 strongly basic anion exchange resin.

The anion exchange resin generally comprises a positively charged matrix and exchangeable anions. The exchangeable anions may be chloride anions ($Cl^-$) and/or hydroxide anions ($OH^-$).

The anion exchange resin may be provided in any form. For example, the anion exchange resin may be provided as beads. The beads may have a size across their largest dimension of from about 0.3 mm to about 1.2 mm, when dry.

When the sequestration material comprises an anion exchange resin, the anion exchange resin may be present in an amount of from about 1 pphl to about 60 pphl, or from about 5 pphl to about 60 pphl, or from about 20 pphl to about 50 pphl, or from about 20 pphl to about 30 pphl, or from about 1 pphl to about 25 pphl, such as from about 2 pphl to about 20 pphl based on the total amount of anion exchange resin and lubricant in the system.

Preferably, the anionic exchange resin is present in an amount of at least about 10 pphl, or at least about 15 pphl relative to the total amount of anionic exchange resin and lubricant in the system. Therefore, the anion exchange resin may be present in an amount of from about 10 pphl to about 25 pphl, or from about 15 pphl to about 20 pphl relative to the total amount of anion exchange resin and lubricant in the system.

It will be appreciated that the anion exchange resin may be present in an amount of about 4 pphl or about 16 pphl based on the total amount of anion exchange resin and lubricant present in the system.

Applicants have found an unexpectedly advantageous ability of industrial grade weakly base anion exchange adsorbent resins, including in particular the material sold under the trade designation Amberlyst A21 (Free Base) to act as a sequestration material. As used herein, the term weak base anion resin refers to resins in the free base form, which are preferably e functionalized with a tertiary amine (uncharged). Tertiary amine contains a free lone pair of electrons on the nitrogen, which results in it being readily protonated in presence of an acid. In preferred embodiments, the ion exchange resin as used according to the present invention is protonated by the acid, then attracts and binds the anionic counter ion for full acid removal, without contributing any additional species back into solution.

Amberlyst A21 is a preferred material in that applicants have found it to be advantageous because it provides a macroporous structure makes it physically very stable and resistant to breakage, and applicants have found that it can withstand high flow rates of the refrigeration system over relatively long periods of time, including preferably over the lifetime of the system.

The amount of anion exchange resin described herein refers to the dry weight of the anion exchange resin. As used herein, the term "dry weight" of the sequestration materials means that the material has 50 ppm or less of moisture.

As used herein, pphl of a particular sequestration material means the parts per hundred of the particular sequestration material by weight based on the total weight of that particular sequestration material and lubricant in the system.

d. Moisture Removing Material

A preferred sequestration material is a moisture removing material. In preferred embodiments the moisture removing material comprises, consists essentially of or consists of a moisture-removing molecular sieve. Preferred moisture-removing molecular sieves include those commonly known as sodium aluminosilicate molecular sieves, and such materials are preferably crystalline metal aluminosilicates having a three dimensional interconnecting network of silica and alumina tetrahedra. Applicants have found that such materials are effective in the systems of the present invention to remove moisture and are most preferably classified according to pore size as types 3A, 4A, 5A and 13X.

The amount that the moisture removing material, and particularly the moisture-removing molecular sieve, and even more preferably sodium aluminosilicate molecular sieve, is preferably from about 15 pphl to about 60 pphl by weight, and even more preferably from about 30 pphl to 45 pphl by weight.

e. Activated Alumina

Examples of activated alumina that applicants have found to be effective according to the present invention and commercially available include those sodium activated aluminas sold under the trade designation F200 by BASF and by Honeywell/UOP under the trade designation CLR-204. Applicants have found that activated alumina in general and the above-mentioned sodium activated aluminas in particular are especially effective for sequestering the types of acidic detrimental materials that are produced in connection with the refrigerant compostions and heat transfer methods and systems of the present invention.

When the sequestration material comprises activated alumina, the activated alumina may be present in an amount of from about 1 pphl to about 60 pphl, or from about 5 pphl to about 60 pphl by weight.

f. Combinations of Sequestration Materials

The composition of the invention may comprise a combination of sequestration materials.

For example, the sequestration material may comprise at least (i) copper or a copper alloy, and (ii) a molecular sieve (e.g. a zeolite) comprising copper, silver, lead or a combination thereof.

In preferred embodiments, which produce unexpected results, including when the exposure is conducted at temperatures both above and below 30 C, the sequestration material may comprise (i) a molecular sieve (e.g. a zeolite) comprising copper, silver, lead or a combination thereof, and (ii) an anion exchange resin.

Alternatively, the sequestration material may comprise (i) copper or a copper alloy, and (ii) an anion exchange resin.

When the combination of sequestration materials comprises an anion exchange resin, the anion exchange resin preferably is present in an amount of from about 1 pphl to about 25 pphl, such as from about 2 pphl to about 20 pphl based on the total amount of anion exchange resin and lubricant in the system.

Preferably, when the combination of sequestration materials comprises an anion exchange resin, the anion exchange resin is present in an amount of at least about 10 pphl, or at least about 15 pphl based on the total amount of anionic exchange resin and lubricant present in the system. Thus, the anion exchange resin may be present in an amount of from about 10 pphl to about 25 pphl, or from about 15 pphl to about 20 pphl relative to the total amount of anion exchange resin and lubricant present in the system).

It will be appreciated that the anion exchange resin may be present in an amount of about 4 pphl or about 16 pphl relative to the total amount of anionic exchange resin and lubricant present in the system).

The amount of anion exchange resin described herein refers to the dry weight of the anion exchange resin. As used herein, the term "dry weight" of the sequestration materials means that the material has 50 ppm or less of moisture.

When the combination of sequestration materials comprises a molecular sieve (e.g. a zeolite) comprising copper, silver, lead or a combination thereof, the molecular sieve (e.g. zeolite) may be present in an amount of from about 1 pphl to about 30 pphl, such as from about 2 pphl to about 25 pphl based on the total amount of molecular sieve (e.g. zeolite) and lubricant present in the system.

Preferably, when the combination of sequestration materials comprises a molecular sieve (e.g. zeolite), the molecular sieve (e.g. zeolite) is present in an amount of at least about 15 pphl, or at least about 18 pphl relative to the total amount of molecular sieve (e.g. zeolite) and lubricant present in the system. Therefore, the molecular sieve (e.g. zeolite) may be present in an amount of from about 15 pphl to about 30 pphl, or from about 18 pphl to about 25 pphl relative to the total amount of molecular sieve (e.g. zeolite) and lubricant present in the system.

It will be appreciated that the molecular sieve (e.g. zeolite) may be present in an amount of about 5 pphl or about 21 pphl based on the total amount of molecular sieve (e.g. zeolite) and lubricant present in the system.

The amount of molecular sieve (e.g. zeolite) described herein refers to the dry weight of the metal zeolite.

When the combination of sequestration materials comprises copper or a copper alloy, the copper or copper alloy may have a surface area of from about 0.01 $m^2$ to about 1.5 $m^2$ per kg of refrigerant, or from about 0.02 $m^2$ to about 0.5 $m^2$ per kg of refrigerant.

It will be appreciated that the copper or copper alloy may have a surface area of about 0.08 $m^2$ per kg of refrigerant.

When a combination of sequestration materials is present, the materials may be provided in any ratio relative to each other.

For example, when the sequestration material comprises an anion exchange resin and a molecular sieve (e.g. a zeolite), the weight ratio (when dry) of anion exchange resin to molecular sieve (e.g. zeolite) is preferably in the range of from about 10:90 to about 90:10, from about 20:80 to about 80:20, from about 25:75 to about 75:25, from about 30:70 to about 70:30, or from about 60:40 to about 40:60.

Exemplary weight ratios of anion exchange resin to metal zeolite include about 25:75, about 50:50 and about 75:25 The systems of the present invention thus preferably include a sequestration material in contact with at least a portion of a refrigerant according to the present invention wherein the temperature of said sequestration material and/or the temperature of said refrigerant when in said contact are at a temperature that is preferably at least about 10 C wherein the sequestration material preferably comprises:
- an anion exchange resin
- activated alumina
- a molecular sieve for removing moisture
- a moisture-removing material, preferably a moisture-removing molecular sieve,
- a combination of above materials.

As used in this application, the term "in contact with at least a portion" is intended in its broad sense to include each of said sequestration materials and any combination of sequestration materials being in contact with the same or separate portions of the refrigerant in the system and is intended to include but not necessarily limited to embodiments in which each type or specific sequestration material is: (i) located physically together with each other type or specific material, if present; (ii) is located physically separate from each other type or specific material, if present; and (iii) combinations in which two or more materials are physically together and at least one sequestration material is physically separate from at least one other sequestration material.

The Refrigerant

The refrigerant composition used in accordance with the present the invention comprises at least about 5% by weight, based on all the refrigerant components in the composition, of a lower alkyl iodoflurocarbon, more preferably at least about 5% by weight of $CF_3I$.

The refrigerant in preferred embodiments comprises at least about 30% by weight, or at least about 50% by weight of a lower alkyl iodoflurocarbon, more preferably at least about 30% by weight of CF3I, or at least about 50% by weight of CF3I.

The refrigerant composition may comprise one or more co-refrigerant compounds selected from the group consisting of HFC-32 (difluoromethane), HFC-125 (pentafluoroatheane), HFC-134a (1,1,1,2-tetrafluoroethane), carbon dioxide, trans-HFO-1234ze (trans-1,3,3,3-tetrafluoropropaene), trans-HFO-1233zd (trans-1-chloro-3,3,3-trifluoropropene), HFC-227ea (1,1,1,2,3,3,3-heptafluoropropane), and combinations thereof.

Preferably, the refrigerant comprises at least about 5%, at least about 30% by weight, or at least about 50% by weight of a lower alkyl iodofluorcarbon, or at least about 5%, at least about 30% by weight, or at least about 50% by weight of $CF_3I$, and at least one additional co-refrigerant compound, said at least one additional co-refrigerant being preferably selected from the group consisting of HFC-32, HFC-125, HFC-134a, HFC-227ea, trans-HFO-1234ze, trans-HFO-1233zd, $CO_2$ and combinations thereof.

Preferably, the refrigerant consists essentially of a lower alkyl iodofluorcarbon, preferably $CF_3I$, and at least one additional compound selected from the group consisting of HFC-32, HFC-125, HFC-134a, HFC-227ea, trans-HFO-1234ze, trans-HFO-1233zd, $CO_2$ and combinations thereof. It will be appreciated that the refrigerant may consist in preferred embodiments of lower alkyl iodofluorcarbon, or may consist of $CF_3I$. The refrigerant may consist essentially of a lower alkyl iodofluorcarbon, or may consist essentially of $CF_3I$.

The refrigerant preferably has a Global Warming Potential (GWP) of not greater than about 700, preferably not greater than about 300, more preferably not greater than about 150, even more preferably not greater than about 100.

The refrigerant preferably has an Ozone Depletion Potential of not greater than about 0.05, more preferably not greater than about 0.02, even more preferably of about zero.

The refrigerant is preferably non-flammable in accordance with ASTM standard E-681-2001 at conditions described in ASHRAE Standard 34-2013 and described in Appendix B1 to ASHRAE Standard 34-2013.

In addition, the refrigerant preferably has an Occupational Exposure Limit (OEL) of greater than about 400.

i. Blends of $CF_3I$ and HFC-32

The methods, as well as the systems and compositions, include refrigerants that comprise $CF_3I$ and HFC-32. Each of the components may be present in the refrigerant in widely ranging amounts.

For example, the refrigerant may comprise $CF_3I$ and HFC-32, wherein the $CF_3I$ is present in an amount of at least about 5% by weight, at least about 30% by weight, or at least about 50% by weight.

Alternatively, the refrigerant may comprise from about 60 wt % to about 66 wt % of $CF_3I$ and from about 34 wt % to about 40 wt % of HFC-32. Preferably, the refrigerant comprises about 36% HFC-32 and about 64% $CF_3I$, or about 38 wt % HFC-32 and about 62 wt % $CF_3I$.

It will be appreciated that the refrigerant may consist essentially of $CF_3I$ and HFC-32. The refrigerant may consist of $CF_3I$ and HFC-32.

Thus, the present invention includes refrigerants which consists essentially of $CF_3I$ and HFC-32, wherein the $CF_3I$ is present in an amount of at least about 5% by weight, at least about 30% by weight, or at least about 50% by weight. The refrigerants according to this paragraph may consist of $CF_3I$ and HFC-32.

The present invention includes a refrigerant which consists essentially of from about 60 wt % to about 66 wt % of $CF_3I$ and from about 34 wt % to about 40 wt % of HFC-32. In preferred embodiments, the refrigerant consists essentially of about 36% HFC-32 and about 64% $CF_3I$, or about 38 wt % HFC-32 and about 62 wt % $CF_3I$. The refrigerants according to this paragraph may consist of $CF_3I$ and HFC-32.

ii. Blends of $CF_3I$, HFC-32 and HFC-125

The methods, as well as the systems and compostions, include refrigerants that comprise $CF_3I$, HFC-32 and HFC-125. Each of the components may be present in the refrigerant in widely ranging amounts.

For example, the refrigerant may comprise $CF_3I$, HFC-32 and HFC-125, wherein the $CF_3I$ is present in an amount of at least about 5% by weight, at least about 30% by weight, or at least about 50% by weight.

Alternatively, the refrigerant may comprise from about 39.5 wt % to about 45.5 wt % of $CF_3I$, from about 42 wt % to about 48 wt % of HFC-32 and from about 6.5 wt % to about 12.5 wt % of HFC-125. Preferably, the refrigerant comprises from about 41 wt % to about 43 wt % of $CF_3I$, from about 45.5 wt % to about 46.5 wt % of HFC-32 and from about 11.5 wt % to about 12.5 wt % of HFC-125.

It will be appreciated that the refrigerant may consist essentially of $CF_3I$, HFC-32 and HFC-125. The refrigerant may consist of $CF_3I$, HFC-32 and HFC-125.

The present invention includes refrigerants which consists essentially of $CF_3I$, HFC-32 and HFC-125, wherein the $CF_3I$ is present in an amount of at least about 5% by weight, at least about 30% by weight, or at least about 50% by weight. The refrigerants according to this paragraph may consist of $CF_3I$, HFC-32 and HFC-125.

The he present invention includes refrigerants which consists essentially of from about 39.5 wt % to about 45.5 wt % of $CF_3I$, from about 42 wt % to about 48 wt % of HFC-32 and from about 6.5 wt % to about 12.5 wt % of HFC-125. Preferably, the refrigerant consists essentially of from about 41 wt % to about 43 wt % of $CF_3I$, from about 45.5 wt % to about 46.5 wt % of HFC-32 and from about 11.5 wt % to about 12.5 wt % of HFC-125. The refrigerants according to this paragraph may consist of $CF_3I$, HFC-32 and HFC-125.

iii. Blends of $CF_3I$, trans-HFO-1234ze and trans-HFO-1233zd

The methods, as well as the systems and compositions, include refrigerants that comprise $CF_3I$, trans-HFO-1234ze and trans-HFO-1233zd. Each of the components may be present in the refrigerant in widely ranging amounts.

For example, the refrigerant may comprise $CF_3I$, trans-HFO-1234ze and trans-HFO-1233zd, wherein the $CF_3I$ is present in an amount of at least about 5% by weight, at least about 30% by weight, or at least about 50% by weight.

Alternatively, the refrigerant may comprise from about 15 wt % to about 21 wt % of $CF_3I$, from about 77 wt % to about 83 wt % of trans-HFO-1234ze and from about 1 wt % to about 2 wt % trans-HFO-1233zd. Preferably, the trans-HFO-1233zd is present in an amount of about 2 wt %.

Preferably, the refrigerant comprises from about 18 wt % to about 21 wt % of $CF_3I$, from about 77 wt % to about 80 wt % of trans-HFO-1234ze and from about 1 wt % to about 2 wt % of trans-HFO-1233zd. Preferably, the trans-HFO-1233zd is present in an amount of about 2 wt %.

It will be appreciated that the refrigerant may consist essentially of $CF_3I$, trans-HFO-1234ze and trans-HFO-1233zd. The refrigerant may consist of $CF_3I$, trans-HFO-1234ze and trans-HFO-1233zd.

The present invention includes refrigerants which consists essentially of $CF_3I$, trans-HFO-1234ze and trans-HFO-1233zd, wherein the $CF_3I$ is present in an amount of at least about 5% by weight, at least about 30% by weight, or at least about 50% by weight. The refrigerants according to this paragraph may consist of $CF_3I$, trans-HFO-1234ze and trans-HFO-1233zd.

There is also disclosed a refrigerant which consists essentially of about 15 wt % to about 21 wt % of $CF_3I$, from about 77 wt % to about 83 wt % of trans-HFO-1234ze and from about 1 wt % to about 2 wt % trans-HFO-1233zd. Preferably, the trans-HFO-1233zd is present in an amount of about 2 wt %. The refrigerant may consist of $CF_3I$, trans-HFO-1234ze and trans-HFO-1233zd.

Preferably, the refrigerant consists essentially of from about 18 wt % to about 21 wt % of $CF_3I$, from about 77 wt % to about 80 wt % of trans-HFO-1234ze and from about 1 wt % to about 2 wt % of trans-HFO-1233zd. Preferably, the trans-HFO-1233zd is present in an amount of about 2 wt %. The refrigerants according to this paragraph may consist of $CF_3I$, trans-HFO-1234ze and trans-HFO-1233zd.

iv. Blends of $CF_3I$, HFC-227ea, trans-HFO-1234ze and trans-HFO-1233zd

The methods, as well as the systems and compostions, include refrigerants that comprise $CF_3I$, HFC-227ea, trans-HFO-1234ze and trans-HFO-1233zd. Each of the components may be present in the refrigerant in widely ranging amounts.

For example, the refrigerant may comprise $CF_3I$, HFC-227ea, trans-HFO-1234ze and trans-HFO-1233zd, wherein the $CF_3I$ is present in an amount of at least about 5% by weight, at least about 30% by weight, or at least about 50% by weight.

Alternatively, the refrigerant may comprise from about 6.6 wt % to about 20.6 wt % of $CF_3I$, about 4.4 wt % HFC-227ea, from about 73 w % to about 87 wt % of trans-HFO-1234ze and from about 1 wt % to about 2 wt % of trans-HFO-1233zd. Preferably, the trans-HFO-1233zd is present in an amount of about 2 wt %.

Preferably, the refrigerant comprises from about 7.6 wt % to about 11.6 wt % $CF_3I$, about 4.4 wt % R227ea, from about 82 wt % to about 86 wt % trans-HFO-1234ze and from about 1 wt % to about 2 wt % trans-HFO-1233zd. Preferably, the trans-HFO-1233zd is present in an amount of about 2 wt %.

It will be appreciated that the refrigerant may consist essentially of $CF_3I$, HFC-227ea, trans-HFO-1234ze and trans-HFO-1233zd. The refrigerant may consist of $CF_3I$, HFC-227ea, trans-HFO-1234ze and trans-HFO-1233zd.

The present invention includes refrigerants which consists essentially of $CF_3I$, HFC-227ea, trans-HFO-1234ze and trans-HFO-1233zd, wherein the $CF_3I$ is present in an amount of at least about 5% by weight, at least about 30% by weight, or at least about 50% by weight.

There is also disclosed a refrigerant which consists essentially of from about 6.6 wt % to about 20.6 wt % of $CF_3I$, about 4.4 wt % HFC-227ea, from about 73 w % to about 87 wt % of trans-HFO-1234ze and from about 1 wt % to about 2 wt % of trans-HFO-1233zd. Preferably, the trans-HFO-1233zd is present in an amount of about 2 wt %. The refrigerants according to this paragraph may consist of $CF_3I$, HFC-227ea, trans-HFO-1234ze and trans-HFO-1233zd.

Preferably, the refrigerant consists essentially of from about 7.6 wt % to about 11.6 wt % $CF_3I$, about 4.4 wt % R227ea, from about 82 wt % to about 86 wt % trans-HFO-1234ze and from about 1 wt % to about 2 wt % trans-HFO-1233zd. Preferably, the trans-HFO-1233zd is present in an amount of about 2 wt %. The refrigerants according to this paragraph may consist of $CF_3I$, HFC-227ea, trans-HFO-1234ze and trans-HFO-1233zd.

v. Blends of $CF_3I$ and HFO-1234yf

The methods, as well as the systems and compositions, include refrigerants that comprise $CF_3I$ and HFO-1234yf. Each of the components may be present in the refrigerant in widely ranging amounts.

For example, the refrigerant may comprise $CF_3I$ and HFO-1234yf, wherein the $CF_3I$ is present in an amount of at least about 5% by weight, at least about 30% by weight, or at least about 50% by weight.

Alternatively, the refrigerant may comprise from about 28 wt % to about 32 wt % of $CF_3I$ and from about 68 wt % to about 72 wt % HFO-1234yf.

It will be appreciated that the refrigerant may consist essentially of $CF_3I$ and HFO-1234yf. The refrigerant may consist of $CF_3I$ and HFO-1234yf.

Thus, there is disclosed a refrigerant which consists essentially of $CF_3I$ and HFO-1234yf, wherein the $CF_3I$ is present in an amount of at least about 5% by weight, at least about 30% by weight, or at least about 50% by weight. The refrigerants according to this paragraph may consist of $CF_3I$ and HFO-1234yf.

The present invention includes refrigerants which consists essentially of from about 28 wt % to about 32 wt % of $CF_3I$ and from about 68 wt % to about 72 wt % HFO-1234yf. The refrigerants according to this paragraph may consist of $CF_3I$ and HFO-1234yf.

vi. Blends of $CF_3I$, HFC-32 and HFO-1234yf

The methods, as well as the systems and compositions, include the refrigerants that may comprise $CF_3I$, HFC-32 and HFO-1234yf. Each of the components may be present in the refrigerant in widely ranging amounts.

For example, the refrigerant may comprise $CF_3I$, HFC-32 and HFO-1234yf, wherein the $CF_3I$ is present in an amount of at least about 5% by weight, at least about 30% by weight, or at least about 50% by weight.

It will be appreciated that the refrigerant may consist essentially of $CF_3I$, HFC-32 and HFO-1234yf. The refrigerant may consist of $CF_3I$, HFC-32 and HFO-1234yf.

The present invention includes refrigerants which consists essentially of $CF_3I$, HFC-32 and HFO-1234yf, wherein the $CF_3I$ is present in an amount of at least about 5% by weight, at least about 30% by weight, or at least about 50% by weight. The refrigerants according to this paragraph may consist of $CF_3I$, HFC-32 and HFO-1234yf.

vii. Blends of $CF_3I$, HFC-32, HFC-125 and HFO-1234yf

The methods, as well as the systems and compositions, include the refrigerants that may comprise $CF_3I$, HFC-32, HFC-125 and HFO-1234yf. Each of the components may be present in the refrigerant in widely ranging amounts.

For example, the refrigerant may comprise $CF_3I$, HFC-32, HFC-125 and HFO-1234yf, wherein the $CF_3I$ is present in an amount of at least about 5% by weight, at least about 30% by weight, or at least about 50% by weight.

Alternatively, the refrigerant may comprise from about 33 wt % to about 41 wt % of $CF_3I$, from about 38 wt % to about 48 wt % of HFC-32, from about 6 wt % to about 12 wt % of HFC-125 and from about 2 wt % to about 12 wt % of HFO-1234yf.

Preferably, the refrigerant comprises from about 34 wt % to about 36 wt % of $CF_3I$, from about 46 wt % to about 48 wt % HFC-32, from about 11 wt % to about 12 wt % HFC-125 and from about 5 wt % to about 7 wt % of HFO-1234yf.

It will be appreciated that the refrigerant may consist essentially of $CF_3I$, HFC-32, HFC-125 and HFO-1234yf. The refrigerants according to this paragraph may consist of $CF_3I$, HFC-32, HFC-125 and HFO-1234yf.

The present invention includes refrigerants which consists essentially of $CF_3I$, HFC-32, HFC-125 and HFO-1234yf, wherein the $CF_3I$ is present in an amount of at least about 5% by weight, at least about 30% by weight, or at least about 50% by weight. The refrigerant may consist of $CF_3I$, HFC-32, HFC-125 and HFO-1234yf.

The present invention includes refrigerants consisting essentially of from about 33 wt % to about 41 wt % of $CF_3I$, from about 38 wt % to about 48 wt % of HFC-32, from about 6 wt % to about 12 wt % of HFC-125 and from about 2 wt % to about 12 wt % of HFO-1234yf. The refrigerants according to this paragraph may consist of $CF_3I$, HFC-32, HFC-125 and HFO-1234yf.

Preferably, the refrigerant consists essentially of from about 34 wt % to about 36 wt % of $CF_3I$, from about 46 wt % to about 48 wt % HFC-32, from about 11 wt % to about 12 wt % HFC-125 and from about 5 wt % to about 7 wt % of HFO-1234yf. The refrigerants according to this paragraph may consist of $CF_3I$, HFC-32, HFC-125 and HFO-1234yf.

viii. Blends of $CF_3I$, HFC-32, HFC-125 and trans-HFO-1234ze

The methods, as well as the systems and compositions, include the refrigerants that may comprise $CF_3I$, HFC-32, HFC-125 and trans-HFO-1234ze. Each of the components may be present in the refrigerant in widely ranging amounts.

For example, the refrigerant may comprise $CF_3I$, HFC-32, HFC-125 and trans-HFO-1234ze, wherein the $CF_3I$ is present in an amount of at least about 5% by weight, at least about 30% by weight, or at least about 50% by weight.

Alternatively, the refrigerant may comprise from about 40 wt % to about 49 wt % of HFC-32, from about 6 wt % to about 12 wt % of HFC-125, from about 33 wt % to about 40 wt % of $CF_3I$, and from about 2 wt % to about 12 wt % trans HFO-1234ze.

Preferably, the refrigerant comprises from about 46.5 wt % to about 48.5 wt % of HFC-32, from about 10.5 wt % to about 12 wt % of HFC-125, from about 34.5 wt % to about 36.5 wt % $CF_3I$, and from about 2 wt % to about 5 wt % trans HFO-1234ze.

It will be appreciated that the refrigerant may consist essentially of $CF_3I$, HFC-32, HFC-125 and trans-HFO-1234ze. The refrigerant may consist of $CF_3I$, HFC-32, HFC-125 and trans-HFO-1234ze.

The present invention includes refrigerants consists essentially of $CF_3I$, HFC-32, HFC-125 and trans-HFO-1234ze, wherein the $CF_3I$ is present in an amount of at least about 5% by weight, at least about 30% by weight, or at least about 50% by weight. The refrigerant may consist of $CF_3I$, HFC-32, HFC-125 and trans-HFO-1234ze.

The present invention includes refrigerants consists essentially of from about 40 wt % to about 49 wt % of HFC-32, from about 6 wt % to about 12 wt % of HFC-125, from about 33 wt % to about 40 wt % of $CF_3I$, and from about 2 wt % to about 12 wt % trans HFO-1234ze. The refrigerants according to this paragraph may consist of $CF_3I$, HFC-32, HFC-125 and trans-HFO-1234ze.

Preferably, the refrigerant consists essentially of from about 46.5 wt % to about 48.5 wt % of HFC-32, from about 10.5 wt % to about 12 wt % of HFC-125, from about 34.5 wt % to about 36.5 wt % $CF_3I$, and from about 2 wt % to about 5 wt % trans HFO-1234ze. The refrigerants according to this paragraph may consist of $CF_3I$, HFC-32, HFC-125 and trans-HFO-1234ze.

ix. Blends of $CF_3I$, HFC-32, $CO_2$ and HFO-1234yf

The methods, as well as the systems and compositions, include the refrigerants that may comprise $CF_3I$, HFC-32, $CO_2$ and HFO-1234yf. Each of the components may be present in the refrigerant in widely ranging amounts.

For example, the refrigerant may comprise $CF_3I$, HFC-32, $CO_2$ and HFO-1234yf, wherein the $CF_3I$ is present in an amount of at least about 5% by weight, at least about 30% by weight, or at least about 50% by weight.

It will be appreciated that the refrigerant may consist essentially of $CF_3I$, HFC-32, $CO_2$ and HFO-1234yf. The refrigerant may consist of $CF_3I$, HFC-32, $CO_2$ and HFO-1234yf.

The present invention includes refrigerants which consists essentially of $CF_3I$, HFC-32, $CO_2$ and HFO-1234yf, wherein the $CF_3I$ is present in an amount of at least about 5% by weight, at least about 30% by weight, or at least about 50% by weight. The refrigerant may consist of $CF_3I$, HFC-32, $CO_2$ and HFO-1234yf.

x. Blends of $CF_3I$, HFC-134a and HFO-1234yf

The methods, as well as the systems and compositions, include the refrigerants that may comprise $CF_3I$, HFC-134a and HFO-1234yf. Each of the components may be present in the refrigerant in widely ranging amounts.

For example, the refrigerant may comprise $CF_3I$, HFC-134a and HFO-1234yf, wherein the $CF_3I$ is present in an amount of at least about 5% by weight, at least about 30% by weight, or at least about 50% by weight.

It will be appreciated that the refrigerant may consist essentially of $CF_3I$, HFC-134a and HFO-1234yf. The refrigerant may consist of $CF_3I$, HFC-134a and HFO-1234yf.

The present invention includes refrigerants which consists essentially of $CF_3I$, HFC-134a and HFO-1234yf, wherein the $CF_3I$ is present in an amount of at least about 5% by weight, at least about 30% by weight, or at least about 50% by weight. The refrigerant may consist of $CF_3I$, HFC-134a and HFO-1234yf.

Lubricants

The heat transfer compositions of the invention include a refrigerant as described herein and optionally at least one lubricant. Preferably, at least one lubricant is present in the heat transfer compositions of the present invention.

When present, the lubricant may be selected from the group consisting of polyol esters (POE), polyalkylene glycols (PAGs), mineral oil, alkylbenzenes (ABs), polyvinyl ethers (PVEs) and poly(alpha-olefin)s (PAOs), and combinations thereof.

Preferably, when present, the lubricant is a polyol ester (POE). Preferably the lubricant is present and is a POE.

The lubricant may be present in the heat transfer composition in an amount of from about 10 to about 60% by weight, from about 20 to about 50% by weight, from about 20 to about 40% by weight, from about 20 to about 30% by weight, from about 30 to about 50% by weight, or from about 30 to about 40% by weight, based on all the components in the heat transfer composition of the invention.

Commercially available mineral oils include Witco LP 250 (registered trademark) from Witco, Suniso 3GS from Witco and Calumet R015 from Calumet. Commercially available alkylbenzene lubricants include Zerol 150 (registered trademark) and Zerol 300 (registered trademark) from Shrieve Chemical. Commercially available esters include neopentile glycol dipelargomate which is available as Emery 2917 (registered trademark) and Hatcol 2370 (registered trademark).

Stabilisers

The heat transfer compositions of the invention include a refrigerant as described herein and may additionally comprise a stabilizer. Preferably, the stabilizer is selected from the group consisting of a primary anti-oxidant, a radical scavenger, a secondary anti-oxidant, and combinations thereof.

Examples of suitable primary anti-oxidants include phenol compounds.

The phenol compound may be a hindered phenol. The phenol may be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone. Preferably the phenol compound is BHT.

The phenol compound can be provided in the heat transfer composition in an amount of from about 0.001% by weight to about 5% by weight, preferably about 0.01% by weight to about 2% by weight, more preferably from about 0.1 to 1% by weight, relative to the total amount of the components in the heat transfer composition, such as the refrigerant and lubricant (if present).

Examples of suitable radical scavengers include diene-based compounds.

The diene-based compounds include C3 to C15 dienes and compounds formed by reaction of any two or more C3 to C4 dienes. Preferably, the diene based compounds are selected from the group consisting of allyl ethers, propadiene, butadiene, isoprene and terpenes. The diene-based compounds are preferably terpenes, which include but are not limited to terebene, retinal, geranoil, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$.

Preferred terpene stabilizers are disclosed in U.S. Provisional Patent Application No. 60/638,003 filed on Dec. 12, 2004, which is incorporated herein by reference.

The diene based compounds can be provided in the composition in an amount of from about 0.001% by weight to about 5% by weight, preferably about 0.01% by weight to about 2% by weight, more preferably from about 0.1 to 1% by weight, relative to the total amount of refrigerant and lubricant (if present).

Further examples of radical scavengers include nitrogen compounds selected from dinitrobenzene, nitrobenzene, nitromethane, nitrosobenzene, and TEMPO [(2,2,6,6-tetramethylpiperidin-1-yl)oxyl].

The nitrogen compounds can be provided in the composition in an amount of from about 0.001% by weight to about 5% by weight, preferably about 0.01% by weight to about 2% by weight, more preferably from about 0.1 to 1% by weight, relative to the total amount of refrigerant and lubricant (if present).

Examples of suitable secondary anti-oxidants include phosphorus compounds and amine based compounds.

The phosphorus compound can be a phosphite or a phosphate compound. For the purposes of this invention, the phosphite compound can be a diaryl, dialkyl, triaryl and/or trialkyl phosphite, in particular one or more compounds selected from hindered phosphites, tris-(di-tert-butylphenyl) phosphite, di-n-octyl phophite, iso-decyl diphenyl phosphite and diphenyl phosphite, particularly diphenyl phosphite.

The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the composition in an amount of from about 0.001% by weight to about 5% by weight, preferably about 0.01% by weight to about 2% by weight, more preferably from about 0.1 to 1% by weight, relative to the total amount of refrigerant and lubricant (if present).

The amine based compound can be one or more secondary or tertiary amines selected from diphenylamine, p-phenylenediamine, triethylamine, tributylamine, diisopropylamine, triisopropylamine and triisobutylamine. For example, the amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2, 6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS @ 1944 (Mayzo Inc) and BLS @1770 (Mayzo Inc). The amine based compound can be an alkyldiphenyl amine such as bis (nonylphenyl amine) or a dialkylamine such as (N-(1-methylethyl)-2-propylamine. Alternatively or in addition, the amine based compound can be one or more of phenyl-alpha-naphthyl amine (PANA), alkyl-phenyl-alpha-naphthyl-amine (APANA) and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, more preferably phenyl-alpha-naphthyl amine (PANA).

The amine based compounds can be provided in the composition in an amount of from about 0.001% by weight to about 5% by weight, preferably about 0.01% by weight to about 2% by weight, more preferably from about 0.1 to 1% by weight, relative to the total amount of refrigerant and lubricant (if present).

Preferably, the stabilizer comprises a phenol compound, and preferably the phenol compound is BHT.

The stabilizer may be present to enhance the performance of the sequestration material.

For example, when the sequestration material comprises a metal or a metal zeolite, a stabilizer may be present, and the stabilizer preferably comprises a radical scavenger.

When the sequestration material comprises an ion exchange membrane, a stabilizer may be present, and the stabilizer preferably comprises a primary antioxidant and/or a secondary antioxidant. For example, the stabilizer may comprise a primary antioxidant and a secondary antioxidant.

Additional Components

The heat transfer compositions of the invention may include, in addition to the refrigerant as described herein, other components for the purpose of enhancing or providing certain functionality to the composition. Such other components or additives may include one or more of dyes, solubilizing agents, compatibilizers, antioxidants, corrosion inhibitors, extreme pressure additives and anti wear additives.

Other additives not mentioned herein can also be included in the heat transfer compositions of the present invention by those skilled in the art in view of the teaching contained herein without departing from the novel and basic features of the present invention.

Combinations of surfactants and solubilizing agents may also be added to the present heat transfer compositions to aid oil solubility as disclosed in U.S. Pat. No. 6,516,837, the disclosure of which is incorporated by reference.

Heat Transfer Systems

The present invention includes heat transfer systems which include refrigerants and/or heat transfer compositions as disclosed herein. Preferred systems of the present invention include vapour compression heat transfer systems, including air conditioning, refrigeration and heat pump systems, absorption refrigeration systems, Rankine cycle systems and heat pipe systems.

As describe above the systems of the present invention preferably include a sequestration material in contact with at least a portion of a refrigerant according to the present invention wherein the temperature of said sequestration material and/or the temperature of said refrigerant when in said contact are at a temperature of at least about 30 C. Any and all of the refrigerants and any and all of the sequestration materials as described herein can be used in the systems of the present invention.

In alternative embodiments, the systems of the present invention include a sequestration material in contact with at least a portion of a refrigerant according to the present invention wherein the sequestration material comprises in combination:

i. a molecular sieve (preferably a zeolite), comprising copper, silver, lead or a combination thereof, and ii. an anion exchange resin.

As used in this paragraph, the term "in combination" is intended in its broad sense to include each of said sequestration materials being in contact with the same or separate portions of the refrigerant in the system and include embodiments in which each sequestration are each located physically together, are each located physically separate and combinations of physically separate and physically together. In preferred embodiments, the sequestration material comprises a molecular sieve (preferably a zeolite), comprising copper, silver, lead or a combination thereof in physical combination with an anion exchange resin. In preferred embodiments, the systems of the present invention comprise said sequestration material being a combination of a molecular sieve (preferably a zeolite), comprising copper, silver, lead or a combination thereof in combination with, and preferably in physical combination with, an anion exchange resin, wherein the temperature of said sequestration material and/or the temperature of said refrigerant when in said contact are at a temperature of at least about 30 C. Any and all of the refrigerants and any and all of the sequestration materials as described herein can be used in the systems of the present invention.

One preferred heat transfer system of the present is a vapour compression heat transfer system which comprises a compressor, an evaporator, and a condenser, each in fluid communication as part of the system, wherein a refrigerant of the present invention circulates to and from each of said compressor, evaporator and a condenser, preferably by conduits, piping, valving, manifolding and the like connecting such elements of the system. It is contemplated that those skilled in the art will be able to readily locate the sequestration materials of the present invention in any and all such systems, and in any heat transfer system, in view of the teachings and disclosures contained herein. In preferred embodiments, the sequestration materials are in relationship to the other elements of the system as indicated below.

i. Location of the Sequestration Material(s)

The sequestration material may be included in the system in a substantially fixed volume, such as by being included in a porous container or structure which allows the refrigerant to come into intimate contact with the fixed volume of the sequestration material and then leave the fixed volume of sequestration material. For the purpose of convenience but not by way of limitation, such a structure is referred to herein as a filter. Such a filter, when used according to the preferred methods and systems of the present invention, which may be located at any point in the heat transfer system, and preferably the vapour compression heat transfer system.

Figure 2A:
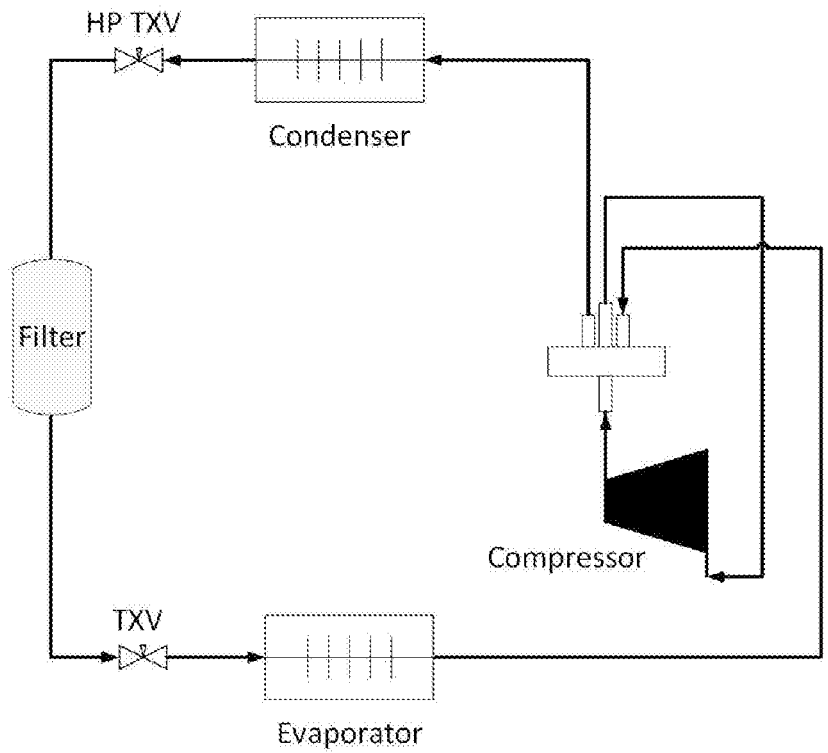
FIG. 2A is a schematic of an exemplary vapour compression heat transfer system and illustrates schematically locations of sequestration materials according to embodiments of the present invention.
Figure 3A:
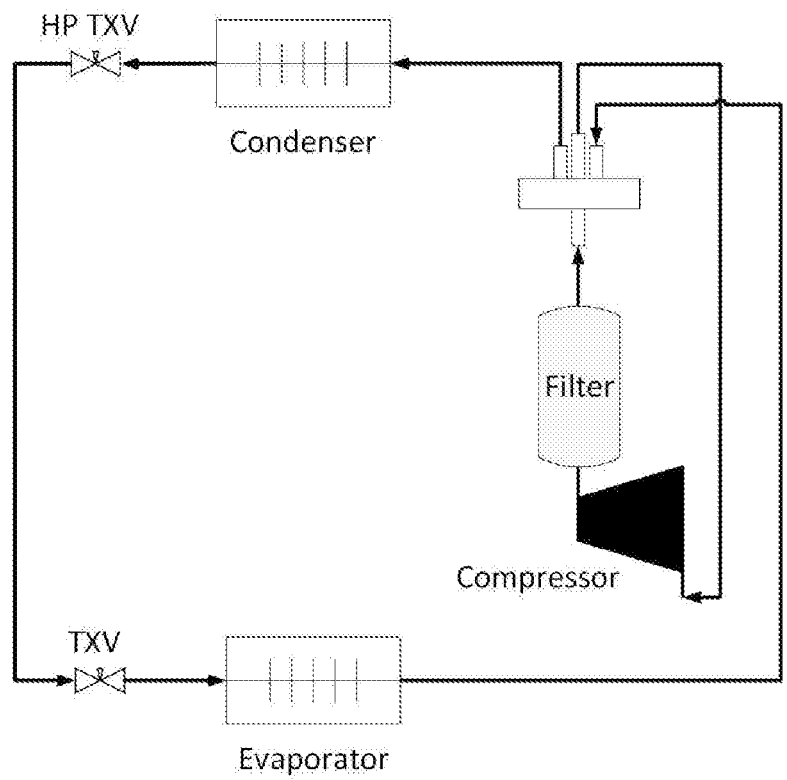
FIG. 3A illustrates schematically locations of sequestration materials according to embodiments of the present invention.

For example, the filter may be located in the suction line between the evaporator and the compressor (see FIG. 1A), the filer may be located in the liquid line between the condenser and the evaporator (see FIG. 2A), or the filter may be located in the discharge line between the compressor and the condenser (see FIG. 3A). In preferred embodiments, the refrigerant streams at those locations are a temperature of at least about 30 C when said system is in operation.

The filter may contain one or more sequestration materials. For example, when a combination of sequestration materials is present in the filter, the filter may comprise (i) copper or a copper alloy as defined herein, and (ii) a molecular sieve (e.g. a zeolite) comprising copper, silver, lead or a combination thereof as defined herein.

Alternatively, the filter may comprise (i) a molecular sieve (e.g. a zeolite) comprising copper, silver, lead or a combination thereof as defined herein, and (ii) an anion exchange resin as defined herein.

Alternatively, the filter may comprise (i) copper or a copper alloy as defined herein, and (ii) an anion exchange resin as defined herein.

When the filter is located in the suction line between the evaporator and the compressor, the filter preferably comprises an anion exchange resin as defined herein.

When the filter is located in the liquid line between the condenser and the evaporator, the filter preferably comprises an anion exchange resin or a molecular sieve (e.g. a zeolite) comprising copper, silver, lead or a combination thereof as defined herein.

When the filter is present in the discharge line between the compressor and the condenser, the filter preferably comprises copper, or a copper alloy as defined herein, or a molecular sieve (e.g. a zeolite) comprising copper, silver, lead or a combination thereof as defined herein.

As set out above, a combination of sequestration materials may be used in the present invention. If two or more sequestration materials are used, they may be used in the same location in the vapour compression heat transfer system (e.g. in the same filter), and/or they may be used in different locations of the vapour compression heat transfer system (e.g., in different filters).

For example, when the sequestration material is present in a filter in the liquid line between the condenser and the evaporator, the sequestration material may comprise a combination of an anion exchange resin and a molecular sieve (e.g. zeolite) as defined herein. Preferably, when the sequestration material is present in a filter in the liquid line between the condenser and the evaporator, the sequestration material may be a combination of an anion exchange resin and a molecular sieve (e.g. a zeolite) as defined herein.

When the sequestration material is present in a filter in the discharge line between the compressor and the condenser, the sequestration material may comprise a combination of copper or a copper alloy, and a molecular sieve (e.g. zeolite) as defined herein. Preferably, when the sequestration material is present in a filter in the discharge line between the compressor and the condenser, the sequestration material may be a combination of copper or a copper alloy, and a molecular sieve (e.g. a zeolite) as defined herein.

If two or more sequestration materials are used, the vapour compression heat transfer system may comprise two or more filters.

Figure 3B:
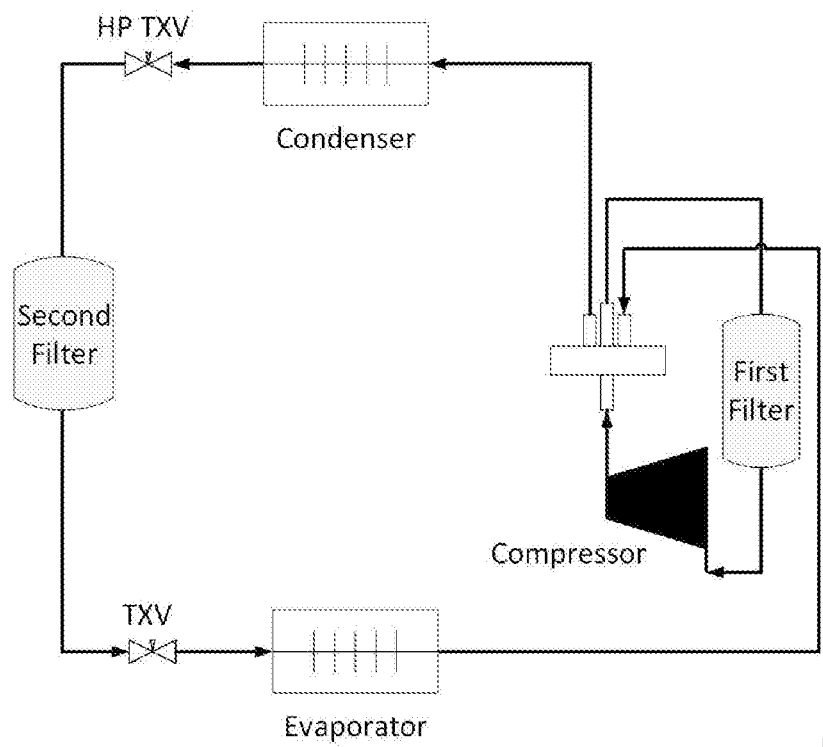
FIG. 3B illustrates schematically locations of sequestration materials according to embodiments of the present invention.

For example, a first filter may be located in the suction line between the evaporator and the compressor, and a second filter may be located in the liquid line between the condenser and the evaporator (see FIG. 3B).

It will be appreciated that if two or more filters are present, each filter may contain one or more sequestration materials.

For example, if a first and a second filter are present, the first filter may comprise an anion exchange resin as defined herein, and the second filer may comprise a molecular sieve (e.g. a zeolite) comprising copper, silver, lead or a combination thereof as defined herein. The first filter may be located in the suction line between the evaporator and the compressor, and the second filter may be located in the liquid line between the condenser and the evaporator.

If a first and a second filter are present, the first filter may comprise an anion exchange resin as defined herein, and the second filer may comprise a molecular sieve (e.g. a zeolite) comprising copper, silver, lead or a combination thereof, or copper or a copper alloy as defined herein. The first filter may be located in the suction line between the evaporator and the compressor, and the second filter may be located in the discharge line between the compressor and the condenser.

ii. Equipment

As detailed herein, the vapor compression embodiments of the present heat transfer systems comprises a compressor, an evaporator and a condenser. Examples of commonly used compressors include reciprocating, rotary (including rolling piston and rotary vane), scroll, screw, and centrifugal compressors.

It will be appreciated that each of the evaporator and the condenser are heat exchangers, and each of such heat exchangers is preferably independently selected from a finned tube heat exchanger, a microchannel heat exchanger, a shell and tube, a plate heat exchanger, and a tube-in-tube heat exchanger.

The vapour compression heat transfer system may comprise an expansion device. Examples of commonly used expansion devices include a capillary tube, a fixed orifice, a thermal expansion valve and an electronic expansion valve.

Preferred vapour compression heat transfer systems include air conditioning systems, including both mobile and stationary air conditioning systems. The air conditioning system may be any one of:
- an air conditioning application including mobile air conditioning, particularly automobile air conditioning,
- a chiller, particularly a positive displacement chiller, more particularly an air cooled or water cooled direct expansion chiller, which is either modular or conventionally singularly packaged,
- a residential air conditioning system, particularly a ducted split or a ductless split air conditioning system,
- an industrial air conditioning system and
- a commercial air conditioning system, particularly a packaged rooftop unit and a variable refrigerant flow (VRF) system.

The vapour compression heat transfer system may be a heat pump. The heat pump maybe anyone of
- a mobile heat pump, particularly an electric vehicle heat pump;
- a residential heat pump,
- a residential air to water heat pump/hydronic system, and
- a commercial air source, water source or ground source heat pump system.

The vapour compression heat transfer system may be a refrigeration system. The term "refrigeration system" refers to any system or apparatus or any part or portion of such a system or apparatus which employs a refrigerant to provide cooling. Thus, the refrigeration system can be any one of:
- a low temperature refrigeration system,
- a medium temperature refrigeration system,
- a commercial refrigerator,
- a commercial freezer,
- an ice machine,
- a vending machine,
- a transport refrigeration system,
- a domestic freezer,
- a domestic refrigerator,
- an industrial freezer, an industrial refrigerator and
a chiller.

A residential air-conditioning system may have an evaporator temperature in the range of about 0 to about 10° C., particularly about 7° C. for cooling and/or in the range of about −30 to about 5° C., particularly about 0.5° C. for heating. The residential air conditioning system may have a reciprocating, rotary (rolling-piston or rotary vane) or scroll compressor. Typical system types are ducted split, ductless split, window, and portable air-conditioning system. The system usually has an air-to-refrigerant evaporator (indoor coil), a compressor, an air-to-refrigerant condenser (outdoor coil), and an expansion device. The evaporator and condenser are usually a finned tube or microchannel heat exchanger.

An air cooled chiller may have an evaporator temperature in the range of about 0 to about 10° C., particularly about 4.5° C. The air cooled chiller may have a positive displacement compressor, more particular an air cooled chiller with a reciprocating or scroll compressor.

A residential heat pump system may be used to supply warm air (said air having a temperature of for example, about 18° C. to about 24° C., particularly about 21° C.) to buildings in the winter. It is usually the same system as the residential air-conditioning system, while in the heat pump mode the refrigerant flow is reversed and the indoor coil becomes condenser and the outdoor coil becomes evaporator. Typical system types are ducted split and ductless split heat pump system. The evaporator and condenser are usually a finned or microchannel heat exchanger.

A residential air to water heat pump hydronic system may have an evaporator temperature in the range of about −30 to about 5° C., particularly about 0.5° C.

A medium temperature refrigeration system may have an evaporator temperature in the range of about −12 to about 0° C., particularly about −8° C. A medium temperature refrigeration system is preferably used to chill food or beverages such as in a refrigerator or a bottle cooler. The system usually has an air-to-refrigerant evaporator to chill the food or beverage, a reciprocating, scroll or screw compressor, an air-to-refrigerant condenser to exchange heat with the ambient air, and a thermal or electronic expansion valve.

A low temperature refrigeration system may an evaporator temperature in the range of about −40 to about −12° C., particularly about −23° C. A low temperature refrigeration system is preferably used in a freezer or an ice cream machine. The system usually has an air-to-refrigerant evaporator, a reciprocating, scroll or screw compressor, an air-to-refrigerant condenser to exchange heat with the ambient air, and a thermal or electronic expansion valve.

A commercial air conditioning system can be a chiller which is used to supply chilled water (said water having a temperature of for example about 7° C.) to large buildings such as offices and hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses.

It will also be appreciated that the sequestration materials described herein may have utility when a composition comprising $CF_3I$ is used as a heat transfer fluid in the secondary loop of a heat transfer system.

Heat Transfer Compositions

As mentioned, the present invention also includes a heat transfer composition circulating in a heat transfer system that has been installed and in operation for a period of at least about 1 year, more preferably at least about 2 years, and even more preferably at least about 5 years, said heat transfer composition comprising:
  (a) at least about 5% by weight of a lower alkyl iodofluorocarbon, and
  (b) not greater than about 1100 ppm (based on the weight of refrigerant) ppm of iodide, more preferably not greater than about 3000 ppm of iodide, more preferably not greater than about 2000 ppm, and even more preferably not greater than about 1000 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
  (a) at least about 25% by weight of a lower alkyl iodofluorocarbon, and
  (b) not greater than about 1100 ppm (based on the weight of refrigerant) ppm of iodide, more preferably not greater than about 1000 ppm of iodide, more preferably not greater than about 900 ppm, and even more preferably not greater than about 800 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
  (a) at least about 50% by weight of a lower alkyl iodofluorocarbon, and
  (b) not greater than about 1100 ppm (based on the weight of refrigerant) ppm of iodide, more preferably not greater than about 1000 ppm of iodide, more preferably not greater than about 900 ppm, and even more preferably not greater than about 800 ppm.

The present invention also includes a heat transfer composition circulating in a heat transfer system that has been installed and in operation for a period of at least about 1 year, more preferably at least about 2 years, and even more preferably at least about 5 years, said heat transfer composition comprising:
  (a) at least about 5% by weight of CF3I, and
  (b) not greater than about 1100 ppm (based on the weight of refrigerant) ppm of iodide, more preferably not greater than about 1000 ppm of iodide, more preferably not greater than about 900 ppm, and even more preferably not greater than about 800 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
  (a) at least about 25% by weight of CF3I, and
  (b) not greater than about 1100 ppm (based on the weight of refrigerant) ppm of iodide, more preferably not greater than about 1000 ppm of iodide, more preferably not greater than about 900 ppm, and even more preferably not greater than about 800 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 1100 ppm (based on the weight of refrigerant) ppm of iodide, more preferably not greater than about 1000 ppm of iodide, more preferably not greater than about 900 ppm, and even more preferably not greater than about 800 ppm.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 5% by weight of a lower alkyl iodofluorocarbon, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
(a) at least about 25% by weight of a lower alkyl iodofluorocarbon, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of a lower alkyl iodofluorocarbon, and
(b) not greater than about 500 ppm of fluoride, more preferably not greater than about 400 ppm of fluoride, more preferably not greater than about 250 ppm, and even more preferably not greater than about 100 ppm.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 5% by weight of CF3I, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
(a) at least about 25% by weight of CF3I, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 500 ppm of fluoride, more preferably not greater than about 400 ppm of fluoride, more preferably not greater than about 250 ppm, and even more preferably not greater than about 100 ppm.

The present invention also includes a heat transfer composition circulating in a heat transfer system that has been in operation for a period of at least about 2 years, said heat transfer composition comprising:
(a) at least about 5% by weight of a lower alkyl iodofluorocarbon, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been in operation for a period of at least about 2 years, said heat transfer composition comprising:
(a) at least about 25% by weight of a lower alkyl iodofluorocarbon, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been in operation for a period of at least about 2 years, said heat transfer composition comprising:
(a) at least about 50% by weight of a lower alkyl iodofluorocarbon, and
(b) not greater than about 500 ppm of fluoride, more preferably not greater than about 400 ppm of fluoride, more preferably not greater than about 250 ppm, and even more preferably not greater than about 100 ppm.

The present invention also includes a heat transfer composition circulating in a heat transfer system that has been in operation for a period of at least about 2 years, said heat transfer composition comprising:
(a) at least about 5% by weight of CF3I, and
(b) not greater than about 500 ppm of fluoride, more preferably not greater than about 400 ppm of fluoride, more preferably not greater than about 250 ppm, and even more preferably not greater than about 100 ppm.

In preferred embodiments, the present invention includes a heat transfer composition circulating in a heat transfer system that has been in operation for a period of at least about 2 years, said heat transfer composition comprising:
(a) at least about 25% by weight of CF3I, and
(b) not greater than about 500 ppm of fluoride, more preferably not greater than about 400 ppm of fluoride, more preferably not greater than about 250 ppm, and even more preferably not greater than about 100 ppm.

In referred embodiments, the present invention includes a heat transfer composition circulating in a heat transfer system that has been in operation for a period of at least about 2 years, said heat transfer composition comprising:
(a) at least about 50% by weight of CF3I, and
(b) not greater than about 500 ppm of fluoride, more preferably not greater than about 400 ppm of fluoride, more preferably not greater than about 250 ppm, and even more preferably not greater than about 100 ppm.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 5% by weight of a lower alkyl iodofluorocarbon, and
(b) not greater than about 500 ppm of fluoride; and
(c) not greater than about 1100 ppm (based on the weight of refrigerant) ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 5% by weight of a lower alkyl iodofluorocarbon, and
(b) not greater than about 400 ppm of fluoride; and
(c) not greater than about 3000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 5% by weight of a lower alkyl iodofluorocarbon, and
(b) not greater than about 1000 ppm of fluoride; and
(c) not greater than about 100 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 25% by weight of CF3I, and
(b) not greater than about 500 ppm of fluoride; and
(c) not greater than about 1100 ppm (based on the weight of refrigerant) ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 25% by weight of CF3I, and
(b) not greater than about 200 ppm of fluoride; and
(c) not greater than about 2000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 25% by weight of CF3I, and
(b) not greater than about 100 ppm of fluoride; and
(c) not greater than about 1000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 500 ppm of fluoride; and
(c) not greater than about 1100 ppm (based on the weight of refrigerant) ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 400 ppm of fluoride; and
(c) not greater than about 1100 ppm (based on the weight of refrigerant) ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 300 ppm of fluoride; and
(c) not greater than about 2000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of a lower alkyl iodofluorocarbon, and
(b) not greater than about 200 ppm of fluoride; and
(c) not greater than about 1000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 500 ppm of fluoride; and
(c) not greater than about 1100 ppm (based on the weight of refrigerant) ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 400 ppm of fluoride; and
(c) not greater than about 1000 ppm (based on the weight of refrigerant) ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 300 ppm of fluoride; and
(c) not greater than about 2000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 200 ppm of fluoride; and
(c) not greater than about 1000 ppm of iodide.

The present invention also includes a heat transfer composition circulating in a heat transfer system that has been installed and in operation for a period of at least about 1 year, more preferably at least about 2 years, and even more preferably at least about 5 years, said heat transfer composition comprising:
(a) at least about 50% by weight of CF3I, and
(b) not greater than about 100 ppm of fluoride; and
(c) not greater than about 1000 ppm of iodide.

The refrigerant and the lubricant may be any of the those as described herein. The composition may additionally comprise a stabilizer as defined herein. The composition may consist essentially of the refrigerant, and the lubricant and stabilizer (if present).

The sequestration material may be as defined herein.

The fluoride and/or iodide concentration may be measured using a Dionex® ICS-2000 ion chromatograph system. For example, the fluoride and/or iodide concentration may be measured according to the following exemplary method.

Exemplary Method for Determining Fluoride and/or Iodide Concentration

Equipment:
DIONEX Ion Chromatograph containing:

| Description | Model Number | Part Number |
| --- | --- | --- |
| Chromatograph | DIONEX ICS-2000 | NA |
| Autosampler | AS-40 Autosampler | 44011 |
| Analytical Column | HPIC-AS18 | 060549 |
| Guard Column | HPIC-AG18 | 060551 |
| Data System Software | Dionex Chromeleon Version 6.50 | 046005 |

Balance: Analytical balance capable of weighing 0.5000 g±0.0001 g 5 mL B-D plastic disposable sample syringe Gelman IC ACRODISC® (0.2 micron) syringe filter, Fisher Scientific P/N 09-730-257, or equivalent Reagents: All reagents are reagent grade unless otherwise specified. Water is ASTM Type II quality or better (minimum 10 megaohm/cm resistivity, ideally 17-18 megaohm/cm resistivity), with no detectable chlorine or chloride. Nitrogen, minimum 10 psi. For blanketing the DI (deionized) water to avoid carbonate adsorption.

Standard: #1) Dionex Five Anion Standard, Product No. 037157, #2) AccuStandard, 100 ug/mL Formate Standard, Product No. IC-FORM-1X-1, #3) AccuStandard, 1000 ug/mL Acetate Standard, Product No. IC-ACET-10X-1.

Operating Procedures:
ICS 2000 pump setting; Flow—1.0 mL/min; Max psi—3000 psi; typical psi—1900 psi
ICS 2000 Eluant Generator Setting: Concentration—7.00 to 45.00 mM; Cartridge type—EluGen_OH
Eluant Program:
−7.00 min=7.00 mM KOH
0.0 min=7.00 mM KOH/inject
5.0 min=7.00 mM KOH
30.0 min=45.00 mM KOH
44.00 min=45.00 mM KOH
45.00 min=7.00 mM KOH ICS 2000 Detector setting: Supp. Type—ASRS 4 mm; SRS Current—120 mA; Ranges—10 μS; Cell Temperature—35° C.; Temperature compensator—1.7%/° C.; Autozero—At the beginning of the run.

Integrator setting: Injection size—20 μL

Standard Solution Preparation:
Standard solution 1: Pipette 1000 μL of the standard #1 and standard #2, and pipette 100 μL of standard #3 into a 100 mL volumetric flask, then dilute to the mark with deionized water. Other organic acids may be added to the standard solution as needed.

Sample Preparation
Tare a 100 mL volumetric flask, then weight approx. 1.000±0.001 mg of sample into the flask. Dilute to volume using deionized water, and mix the ample thoroughly. Filter the solution through a Gelman 0.2 micron syringe filter directly into a Dionex 5 mL Autosampler vial.

Ion Chromatography (IC) Method
Set up the IC using the above listed operating conditions and allow the ion chromatograph to equilibrate until a consistent conductivity is obtained on the detector and a stable baseline is obtained, Calibrate the system by injecting standard #1, #2 and #3.

After the system has been calibrated, run a blank sample using deionized water to ensure no chlorine is contained in the dilution water used.

Then inject all samples for analysis in duplicate. The equipment will report the amount of anions and organic acids in micrograms/gram in the sample. Report the average of the 2 samples.

DESCRIPTION OF THE FIGURES

FIG. 1A shows a schematic of an exemplary vapour compression heat transfer system comprising a compressor, an evaporator and a condenser. The system also contains a filter in the suction line between the evaporator and the compressor.

The filter contains the sequestration material. The filter may comprise one or more sequestration materials. For example, the filter may comprise an anion exchange resin.

When the vapour compression heat transfer system is an air conditioning system, the temperature in the suction line may be in the range of from about 5° C. to about 20° C.

Figure 1B:
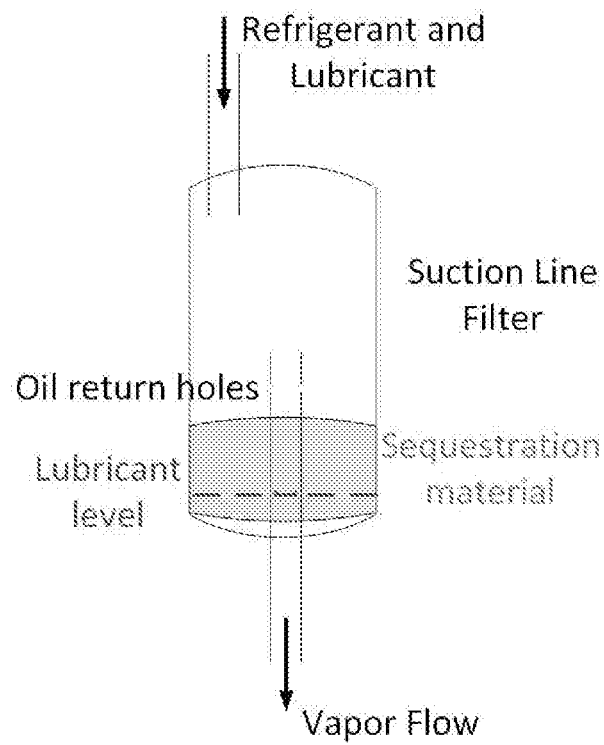
FIG. 1B is a schematic of an exemplary filter.

FIG. 1B is a schematic of an exemplary filter. The filter may be used in the suction line between the evaporator and the compressor (i.e. in the apparatus set out in FIG. 1A).

Air conditioning systems, such as ductless mini-split air conditioning systems may have an accumulator in the suction line. Thus, an accumulator may be modified as shown in FIG. 1B to incorporate a sequestration material. For example, the filter may comprise an anion exchange resin.

The composition containing refrigerant (primarily vapour) and lubricant may flow into the filter through the inlet tube. Refrigerant vapour exits the filter through the outlet tube. The lubricant may pass through the sequestration material at the base of the filter, and exit the filter by passing through the lubricant return holes into the outlet tube.

Preferably, the level of the lubricant return holes is higher than the level of the sequestration material in the filter. In such a configuration, the lubricant will be retained in the base of the filter with the sequestration material until the level of the lubricant is high enough to pass through the lubricant return holes.

FIG. 2A is a schematic of an exemplary vapour compression heat transfer system comprising a compressor, an evaporator and a condenser. The system also contains a filter in the liquid line between the evaporator and the condenser.

The filter contains the sequestration material. The filter may comprise one or more sequestration materials. For example, the filter may comprise an anion exchange resin, or a metal zeolite comprising copper, silver, lead or a combination thereof. The filter may comprise an anion exchange resin, and a metal zeolite comprising copper, silver, lead or a combination thereof.

When the vapour compression heat transfer system is an air conditioning system, the temperature in the liquid line may be in the range of from about 35° C. to about 65° C.

Figure 2B:
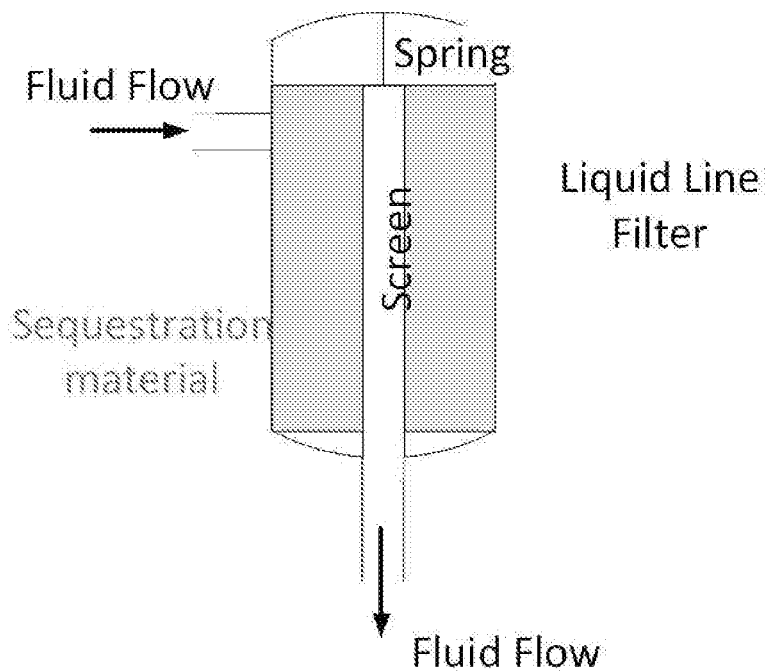
FIG. 2B is a schematic of an exemplary filter which incorporates a sequestration material.

FIG. 2B is a schematic of an exemplary filter. The filter may be used in the liquid line between the evaporator and the condenser (i.e. in the apparatus set out in FIG. 2A).

Air conditioning systems typically comprise a dryer in the liquid line. Thus, a dryer may be modified as shown in FIG. 2B to incorporate a sequestration material. For example, the filter may comprise an anion exchange resin, a metal zeolite comprising copper, silver, lead or a combination thereof, or the filter ay comprise a combination of an anion exchange resin, and a metal zeolite comprising copper, silver, lead or a combination thereof.

The composition containing refrigerant and optionally lubricant may flow into the filter through the inlet tube, and may contact the sequestration material as it passes through the filter and exits through the outlet tube.

FIG. 3A is a schematic of an exemplary vapour compression heat transfer system comprising a compressor, an evaporator and a condenser. The system also contains a filter in the discharge line between the compressor and the condenser The filter contains the sequestration material. The filter may comprise one or more sequestration materials. For example, the filter may comprise a metal selected from copper, silver, lead or a combination thereof.

When the vapour compression heat transfer system is an air conditioning system, the temperature in the discharge line may be in the range of from about 80° C. to about 150° C.

FIG. 3B is a schematic of an exemplary vapour compression heat transfer system comprising a compressor, an evaporator and a condenser. The system also contains a first filter in the suction line between the compressor and the evaporator, and a second filter in the liquid line between the condenser and the evaporator.

The first filter and the second filter contain a sequestration material. The sequestration material in the first filter may be the same as, or different to the sequestration material in the second filter. The first filter may comprise a combination of sequestration materials. The second filter may comprise a combination of sequestration materials.

For example, the first filter may comprise an anion exchange resin. The second filter may comprise a metal zeolite comprising copper, silver, lead or a combination thereof. The second filter may comprise an anion exchange resin and a metal zeolite comprising copper, silver, lead or a combination thereof.

Filter Assembly

Figure 4:
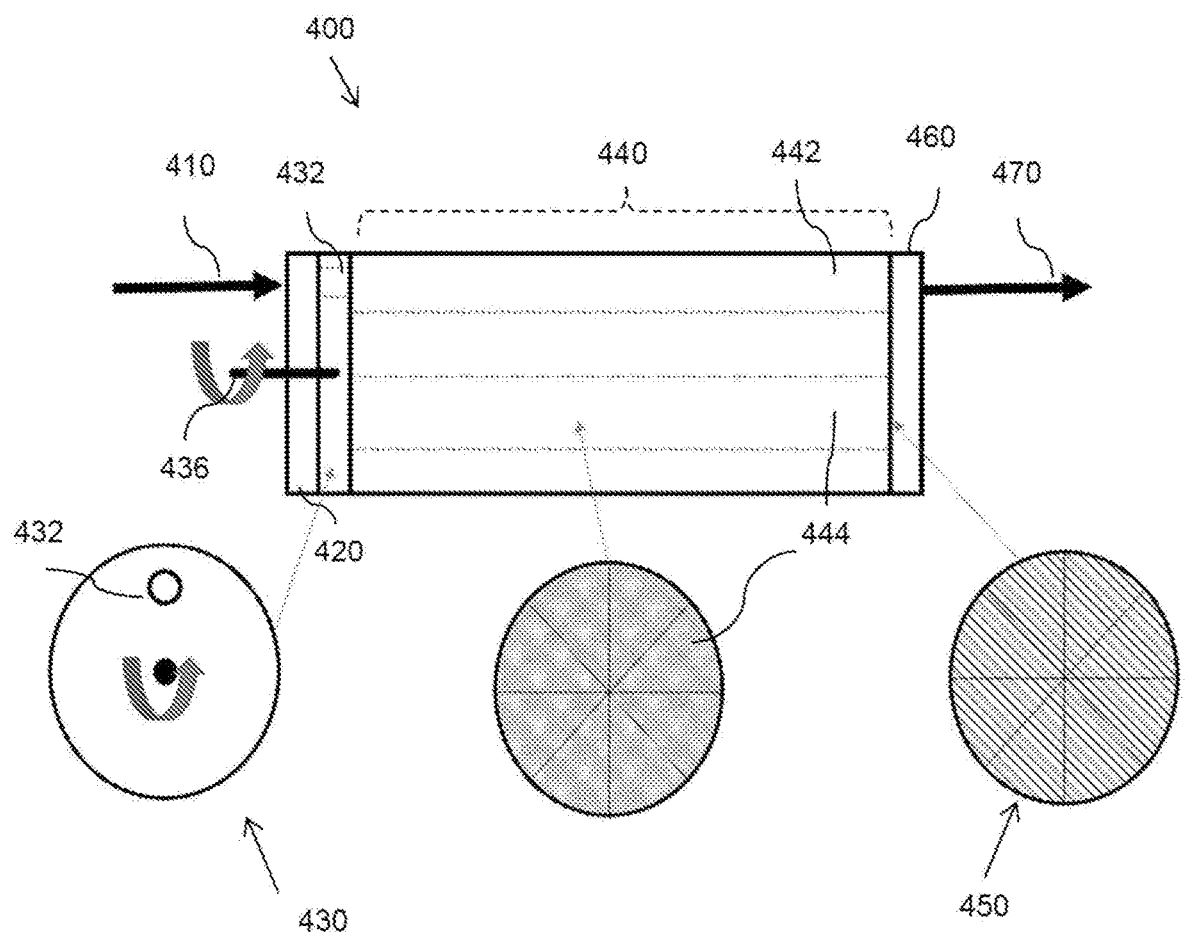
FIG. 4 is a schematic view of a filter assembly in accordance with one embodiment of the present disclosure.

FIG. 4 depicts a filter assembly 400 in accordance with the present disclosure. The filter assembly 400 has utility in a vapour compression heat transfer system, including air conditioning, refrigeration and heat pump applications.

Vapour compression heat transfer systems typically comprise filter/sequestration material. This material can become saturated over time and thus lose its effectiveness. In some systems, for example residential systems, it can be difficult to replace the material once it is saturated. For example, to replace a filter in some prior systems, the connecting lines, for example the liquid line in the case of a liquid line filter, have to be cut to remove the filter and the new filter has to be connected. The replacement of a filter in such a system often needs to be overseen by a professional contractor due to the complexity of the job, which adds time, expense and is not convenient for the owners of, for example, a residential system.

The proposed filter can be rotated, or otherwise moved and/or actuated, in order to introduce fresh filter material to the fluid which passes through the filter material. In some embodiments, the filter is compartmentalized to include several compartments containing filter material. The compartmentalized filter can be rotated after the filter material in a particular compartment becomes saturated, or before the material becomes saturated. The new compartment with fresh filter material is then exposed to refrigerant-oil flow. Rotating the filter to expose fresh filter material to fluid flow can be done manually by the user, or automatically by a suitable mechanism. In this way, a convenient and cost-effective filter assembly is provided to the user.

The filter assembly 400 comprises a fluid inlet 410, an outlet 470, and a filtering unit 440. The filtering unit 440 is cylindrical in shape. The filtering unit 440 comprises at least one filter compartment 444 comprising a sequestration material of the present disclosure. The filter compartments 444 may also be called filter chambers. The filtering unit 440 preferably comprises a plurality of filter compartments 444, each of which comprises a sequestration material disclosed herein.

The filter assembly 400 comprises an inlet chamber 420, into which fluid may flow by way of the fluid inlet 410. The fluid inlet 410 is configured and arranged to provide fluid into the inlet chamber 420. The fluid may comprise the refrigerant of the present disclosure, and may optionally comprise a lubricant and/or a stabilizer. Preferably, a lubricant is present.

The filter assembly 400 comprises an actuatable element 430 which can be moved relative to the filtering unit 440. The actuatable element 430 is rotatable with respect to the filtering unit 440, and thus may be described as a rotatable element. The actuatable element 430 in FIG. 4 is a rotatable plate. The rotatable plate is cylindrical in shape, and comprises a fluid-flow region in the form of an aperture. The fluid-flow region allows fluid to enter the filtering unit, and therefore may be described as an actuatable element inlet. In this manner, the actuatable element 430 comprises a filtering unit inlet 432. The actuatable element 430 may be actuated, for example rotated, with respect to the filtering unit 440 in order to align the actuatable element inlet 432 with different regions of the sequestration material comprised within the filtering unit. In particular, the actuatable element 430 can be actuated such that the filtering unit inlet 432 becomes aligned with different filter compartments 444 of the filtering unit 440, as will be discussed in greater detail below. The actuatable element 430 also comprises a blocking region. When the blocking region is aligned with a filter compartment, fluid may not flow from the inlet, through the blocked filter compartment, to the outlet. The use of an actuatable element 430 in this manner is advantageous, as it will be appreciated that the actuatable element 430 can be smaller or otherwise easier to actuate/rotate than the entire filtering unit.

The provision of filter compartments 444 is advantageous. If the filtering unit has a single large compartment comprising filter material, effecting rotation between the actuatable element inlet 432 and the filtering unit 440 will mean that fresh filter material is introduced to the fluid flow. However, such a filter compartment may be relatively large, making it difficult to maintain the necessary pressure as fluid flows into the filter assembly. By providing a compartmentalized filter, the size of each compartment can be designed such that an optimal pressure is maintained as fluid flows into the filtering unit. The actuatable element 430 comprises a user grip region and/or a handle 436. A user may use the user grip region and/or handle 436 to manually actuate the actuatable element 430, in order to effect the alignment of the filtering unit inlet 432 with different filter compartments of the filtering unit.

The actuatable element 430 is arranged coaxially with the filtering unit. The filtering unit 440 comprises a plurality of filter compartments 444. The filtering unit 440 is cylindrical in shape, and in cross-section is circular in shape. The filtering compartments are arranged within the filtering unit such that, in cross-section, the filtering compartments are sector or 'wedge' shaped. Each filter compartment of the plurality of filter compartments comprises sequestration material. Each filter compartment comprises an inlet end and an outlet end, as defined by the direction of fluid flow when the filter assembly 400 is in use.

The filter assembly 400 further comprises a valve element 450. The valve element 450 may also be described as a shutter or shutter element. The shutters may be described as check valves or one-way valves. The valve element 450 is arranged intermediate the outlet ends of the filtering compartments 444 and the outlet 470. The valve element 450 opens in response to positive pressure within the filtering unit. In more detail, the valve element 450 opens to allow fluid flow in response to pressure within at least one of the filtering compartments reaching a pressure threshold. The valve element 450 opens only in the region of the outlet end of the particular filter compartment inside which the pressure has reached the pressure threshold, while remaining closed in the regions of the outlet ends of those filter compartments 444 inside which the pressure has not reached the pressure threshold. The valve element 450 may take any suitable form, and may be a valve assembly or other arrangement of valves, as would be appreciated by the skilled person. The valve element 450 may have sections which each have a shape and size which corresponds with the shape and size of the outlet ends of the filter compartments 444. For example, in the embodiment of FIG. 4 in which the outlet ends of the filter compartments 444 are 'wedge-shaped', the valve element 450 may have wedge shaped sections, each of which may open and close independently of one another such that the valve element may allow fluid to flow through one or more of the filer compartments 444 but fluid flow remains blocked by the valve element 450 through one or more other filter compartments 444. In a simple embodiment, the valve element may comprise resilient flaps which, in a rest position, lay flat against the valve element such that fluid flow is blocked through the filter compartments 444. Once the pressure threshold is reached in a particular filter compartment 444, the pressure inside the particular filter compartment 444 acts to push open the flaps to an open position in which fluid can flow through the valve element 450 and into an outlet chamber 460. Once pressure falls below the threshold, the flaps return to the rest position and thus the valve closes again.

The filter assembly 400 further comprises an outlet chamber 460. The outlet chamber 460 may comprise the outlet 460. Fluid may pass through the valve element 450 and into the outlet chamber 460.

In use, fluid passes through the fluid inlet 410 into the inlet chamber 420. Fluid then passes through the filtering unit inlet 432, and into the selected filter compartment 442. The selected filter compartment 442 is the filter compartment, or the plurality of filter compartments, which is in fluid communication with the filtering unit inlet 432 and outlet 470 such that fluid may pass from the filtering unit inlet 432, through the selected filter compartment 442, to the outlet 470. The filtering unit inlet 432 is aligned with the inlet end of the selected filter compartment 442, thus allowing fluid to flow into the selected filter compartment 442. The actuatable element 430 blocks and/or occludes the other filter compartments 444 of the filtering unit 430, thus disallowing fluid from flowing into these blocked filter compartments 444.

As the fluid passes through the selected filter compartment 442, the sequestration material acts to sequester, or scavenge for halogen or halide ions (e.g. fluoride, iodide or iodine).

As fluid flows into the selected filter compartment 442, pressure builds up within the selected filter compartment 442. Once the pressure within the selected filter compartment 442 reaches a threshold pressure, the valve element 450 opens in the region of the outlet end of the selected filter compartment 442, thus allowing fluid to flow from the selected filter compartment 442 into the outlet chamber 460, and finally out of the outlet 470 and thus out of the filter assembly 400 and back into the heat exchange system.

It will be understood that the above description of a specific embodiment is by way of example only and is not intended to limit the scope of the present disclosure. Many modifications of the described embodiments are envisaged and intended to be within the scope of the present disclosure.

For example, while effecting relative rotation between the filtering unit and filtering unit inlet has been primarily described in relation to rotating a rotatable plate comprising the filtering unit inlet, it will be appreciated that the filter unit itself may be rotated with respect to the filter unit inlet.

Rather having a plurality of filter compartments, the filter unity may have just one filter compartment. In such an embodiment, as the rotating plate/actuatable element is rotated, different regions of the sequestration material become aligned with the filtering unit inlet. Thus, it is possible to rotate the plate, and thus the inlet, in order that fluid entering the filter unit encounters fresh filter material.

The method of actuation/rotation may also be automated and/or effected using electronic means, as will be described in further detail below.

The filtering assembly has primarily been described herein in relation to a sequestration material comprising:
  a. copper, a copper alloy,
  b. a molecular sieve (such as a zeolite), comprising copper, silver, lead or a combination thereof
  c. an anion exchange resin
  d. a combination of any of the above.

However, it will also be appreciated by the skilled person that the filtering unit has application not just for such a sequestration material, but also for any sequestration material, such as a metal-organic framework (MOF) or indeed any filter material.

Also disclosed herein is a method of selecting which of the filter compartments, or which region of the sequestration material comprised with the filtering unit, the fluid is to flow through in use. The method comprises effecting relative movement between the inlet and the filtering unit such that, as the relative movement is effected, different regions of the sequestration material comprised within the filtering unit become aligned with the inlet.

In more detail, the method involves actuating, for example rotating, the actuatable element 430 such that the filtering unit inlet 432 of the actuatable element 430 can be aligned with different filter compartments 444 within the filtering unit 430. The method can be conducted manually, for example by a user turning the handle 436 of the actuatable element 430 and thus adjusting the alignment of the filtering unit inlet 432 and the filtering unit 430.

The method can also be performed automatically, for example using electronic selecting means (not shown in FIG. 4). The selecting means can be described as a selector. The selector may comprise a processor, circuitry and the actuatable element 430, and is configured to actuate the actuatable element 430. The selector may also comprise a memory containing instructions which, when executed by the processor, perform the herein disclosed method. The selector is arranged and configured to effect the relative movement between the filtering unit inlet 432 and the filtering unit 440. The selector monitors the operation time of the heat exchange system, and/or may comprise a sensor or an array of sensors which monitors the amount of fluid which has passed through the selected filter compartment 442. Once a threshold has been reached, for example a threshold operation time and/or a threshold relating to the amount of fluid which has passed through the selected filter compartment 442, the selector may effect the relative movement in order to adjust which filter compartment is the active, or selected, filter compartment 432. In other words, the selector can redirect the fluid which passes though the filter assembly 400 through a different one of the filter compartments.

The selector may be arranged and configured to effect the relative movement between the filtering unit inlet 432 and the filtering unit 440, for example the rotation of the actuatable element comprising the filtering unit inlet 432, in response to a variety of triggers. As described above, one trigger may be reaching a time threshold of the system operation time. Another example of a suitable trigger may be the receipt of an indication of refrigerant breakdown. In such an embodiment, the selector comprises a monitoring system for monitoring levels of TAN, fluoride or iodide. A suitable trigger, such as a threshold relating to the value of one or all of these materials, can be effected in the system. Once the threshold is reached, rotation of the actuatable element is effected by the selector.

The approach described herein in relation to the filter assembly may be embodied on a computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

The disclosed filter assembly, and methods relating thereto, are advantageous. By allowing the region of sequestration material which comes into contact with the fluid to be adjusted, the lifetime of the filter assembly can be extended with respect to prior art filter assemblies.

EXAMPLES

Example 1

The ability of copper to act as a sequestration material was tested.

A blend of 50 wt % POE oil (POE ISO 32, Emkarate RL 32-3MAF) which comprises a primary anti-oxidant stabilizer BHT in an amount of about 1000 ppm, and 50 wt % $CF_3I$ was placed in a sealed tube with metal coupons. The surface area of the copper was about 0.08 $m^2$ per kg of refrigerant. The sealed tune was then heated for 2 weeks at 175° C., causing breakdown of the refrigerant and the lubricant. The sealed tubes were then opened and samples of the oil were taken.

The Total Acid Number (TAN), iodide ppm and fluoride ppm of the sample were measured at the start (i.e. before heating) and at the end (i.e. after heating) of the sample.

TAN was measured in accordance with ASTM D974-06, Standard Test Method for Acid and Base Number by Color-Indicator Titration.

The fluoride and iodide ppm were measured using a Dionex® ICS-2000 ion chromatograph system, following the method described above under the heading "Exemplary method for determining fluoride and/or iodide concentration".

The results of the tests are set out in Table 1.

TABLE 1

Effect of copper on TAN, fluoride and iodide concentration.

| Material | TAN | | Fluoride (ppm) | | Iodide (ppm) | |
|---|---|---|---|---|---|---|
| | Start | End | Start | End | Start | End |
| Steel, Aluminum | 3.8 | 6.8 | 1.0 | 38.0 | <0.05 | 49.0 |
| Steel, Aluminum + Copper | 3.8 | 4.7 | 1.0 | 15.0 | <0.05 | <0.05 |

The results demonstrate that the TAN, fluoride and iodide concentration are surprisingly lower in the presence of copper, as compared to when copper is absent. Thus, the results indicate that the refrigerant and the lubricant degrade to a lesser extent when copper is present, than when copper is absent.

When copper is absent, the concentration of iodide dramatically increases upon heating. However, surprisingly the iodide concentration does not change upon heating in the presence of copper, which is understood to result in improved system reliability.

Example 2

The ability of a zeolite comprising silver to act as a sequestration material was tested.

The zeolite tested was UPO IONSIV D7310-C, available form Honeywell UOP. The openings have a size across their largest dimension of from about 15 to about 35 Å.

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 190° C. These conditions caused breakdown of the refrigerant and the lubricant. The sealed tubes were then opened and samples of the oil were taken.

The oil sample was then placed in Fischer-Porter tubes with the zeolite. The amount of dry zeolite relative to the sample (lubricant) was measured. The tubes were then maintained at either 15° C. or 50° C. for 114 hours (4.75 days). The tubes were shaken every two hours to ensure proper mixing of the zeolite and the sample.

The Total Acid Number (TAN), iodide ppm and fluoride ppm of the sample were measured at the start (i.e. after degradation of the $CF_3I$ and POE oil, and before combination with the zeolite), and at the end (i.e. after combination with the zeolite, and at the end of the 114 hours at 15° C. or 50° C.). TAN, fluoride and iodide concentration were measured according to the same methods as Example 1.

The results of the tests are set out in Table 2.

TABLE 2

Effect of zeolite on TAN, fluoride and iodide concentration

| Temp. | Amount of zeolite relative to sample (pphl) | TAN Start | TAN End | Fluoride (ppm) Start | Fluoride (ppm) End | Iodide (ppm) Start | Iodide (ppm) End |
|---|---|---|---|---|---|---|---|
| 15° C. | 4.8 pphl | 30.0 | 29.4 | 94.8 | 61.5 | 57.4 | 14.2 |
|  | 20.5 pphl | 30.0 | 24.7 | 94.8 | 46.4 | 57.4 | 5.5 |
| 50° C. | 5.4 pphl | 30.0 | 29.7 | 94.8 | 45.2 | 57.4 | 8.1 |
|  | 22.1 pphl | 30.0 | 23.3 | 94.8 | 39.2 | 57.4 | 0.1 |

The above tests demonstrate the ability of the zeolite to effectively "recover" a composition of POE oil and a $CF_3I$ refrigerant after it has degraded.

The results demonstrate that the zeolite was able to reduce the iodide and the fluoride level of the degraded sample at both 15° C. and 50° C. when using either about 5 pphl zeolite or about 21 pphl zeolite. However, the zeolite performed better at 50° C. than at 15° C., and at about 21 pphl zeolite than at about 5 pphl zeolite. Surprisingly, very little iodide was detected at about 21 pphl zeolite at 50° C.

The results also show that, at a concentration of about 21 pphl zeolite, the TAN was reduced at both 15° C. and at 50° C.

Example 3A

The ability of an anion exchange resin to act as a sequestration material was tested.

Two different anion exchange resins were tested.

First Resin

The first resin was a strongly basic (type 1) anion exchange resin with chloride exchangeable ions (Dowex® 1X8 chloride form).

| Product Name | Dowex® 1X8 chloride form |
|---|---|
| Composition | Moisture content, 43-48% |
| Limit | 66° C. max. temp. |
| Cross-linkage | 8% |
| Matrix | Styrene-divinylbenzene (gel) |
| Particle size | 50-100 mesh |
| Operating pH | 0-14 |
| Capacity | 1.2 meq/mL total capacity |

The first resin was used without modification.

Second Resin

The second resin was a strongly basic (type 1) anion exchange resin with chloride exchangeable ions (Dowex® 1X8 chloride form).

| Product Name | Dowex® 1X8 chloride form |
|---|---|
| Composition | Moisture content, 43-48% |
| Limit | 66° C. max. temp. |
| Cross-linkage | 8% |
| Matrix | Styrene-divinylbenzene (gel) |
| Particle size | 50-100 mesh |
| Operating pH | 0-14 |
| Capacity | 1.2 meq/mL total capacity |

The second resin was converted from the chloride form to the hydroxide form prior to use in the following example by slowly washing the resin for at least 1 hour with 5 to 10 bed volumes of 4% NaOH, followed by washing with deionized water until the pH of the effluent is 7, 0.5. The pH was measured using litmus paper.

Method and Results

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 190° C. These conditions caused breakdown of the refrigerant and the lubricant. The sealed tubes were then opened and samples of the oil were taken.

The sample was then placed in Fischer-Porter tubes with the anion exchange resin. The amount of dry resin relative to the sample was measured. The tubes were then maintained at either 15° C. or 50° C. for 114 hours (4.75 days). The tubes were shaken every two hours to ensure proper mixing of the resin and the sample.

The Total Acid Number (TAN), iodide ppm and fluoride ppm of the sample were measured at the start (i.e. after degradation of the $CF_3I$ and POE oil, and before combination with the resin), and at the end (i.e. after combination with the resin, and at the end of the 114 hours at 15° C. or 50° C.). TAN, fluoride and iodide concentration were measured according to the same methods as Example 1.

The results are set out in Table 3 below.

TABLE 3

Effect of anion exchange resin on TAN, fluoride and iodide concentration

| Material | Temp. | Amount of IE relative to sample (lubricant) | TAN Start | TAN End | Fluoride (ppm) Start | Fluoride (ppm) End | Iodide (ppm) Start | Iodide (ppm) End |
|---|---|---|---|---|---|---|---|---|
| First resin | 15° C. | 3.9 pphl | 30.0 | 30.7 | 94.8 | 65.5 | 57.4 | 32.4 |
|  |  | 16.0 pphl | 30.0 | 30.9 | 94.8 | 61.9 | 57.4 | 19.9 |
|  | 50° C. | 4.5 pphl | 30.0 | 31.1 | 94.8 | 55.2 | 57.4 | 25.8 |
|  |  | 16.7 pphl | 30.0 | 39.4 | 94.8 | 44.7 | 57.4 | 17.5 |
| Second resin | 15° C. | 3.8 pphl | 30.0 | 26.0 | 94.8 | 54.3 | 57.4 | 15.0 |
|  |  | 15.2 pphl | 30.0 | 14.5 | 94.8 | 44.3 | 57.4 | 4.5 |
|  | 50° C. | 4.8 pphl | 30.0 | 26.8 | 94.8 | 46.2 | 57.4 | 7.6 |
|  |  | 16.7 pphl | 30.0 | 13.1 | 94.8 | 22.6 | 57.4 | 2.5 |

The above tests demonstrate the ability of anion exchange resins to effectively "recover" a composition of POE oil and a $CF_3I$ refrigerant after it has degraded.

The results demonstrate that both resins were able to reduce the iodide and the fluoride level of the degraded sample at both 15° C. and 50° C. when using either about 4 pphl resin or about 16 pphl resin. Both resins performed better at 50° C. than at 15° C., and at about 16 pphl resin than about 4 pphl zeolite.

The second resin was able to reduce the TAN of the sample at both temperatures (i.e. 15° C. and at 50° C.), and at both concentrations of resin (i.e. at about 4 pphl and about 16 pphl resin).

Example 3B

Example 3A is repeated except that the following two anion resins were used:

A—An industrial grade weak base anion exchange resin sold under the trade designation Amberlyst A21 (Free Base) having the following characteristics:

| Product Name | Amberlyst A21 |
|---|---|
| Composition | Moisture content, 58-62% |
| Limit | 100° C. max. temp. |
| Ionic Form | Free Base (FB) |
| Matrix | Macroporous |
| Particle size | 490-690 μm |
| Concentration of active sites | >4.6 eq/kg >1.3 eq/L |

B—An industrial grade weak basic anion exchange resin sold under the trade designation Amberlyst A22 having the following characteristics:

| Product Name | Amberlyst A22 |
|---|---|
| Composition | Moisture content, 40-50% |
| Limit | 100° C. max. temp. |
| Ionic Form | Free Base (FB) |
| Structure | Styrene-divinylbenzene |
| Matrix | Macroporous |
| Particle size | 475-600 μm |
| Capacity | >1.7 eq/L |

Each of these resins were found to be effect to remove and/or reduce the above-noted materials.

Example 4

The ability of combination of anion exchange resin and zeolite to act as a sequestration material was tested.

Anion Exchange Resin

The resin was a strongly basic (type 1) anion exchange resin with hydroxyl exchangeable ions (Dowex® Marathon™ A, hydroxide form).

| Product Name | Dowex ® Marathon ™ A, hydroxide form |
|---|---|
| Moisture | 60-72% |
| Matrix | Styrene-divinylbenzene (gel) |
| Particle size | 23-27 mesh |
| Capacity | 1.0 meq/mL by wetted bed volume |

The resin was used without modification.

Zeolite

The zeolite tested was UPO IONSIV D7310-C, available form Honeywell UOP. The openings have a size across their largest dimension of from about 15 to about 35 Å.

Method and Results

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 175° C. These conditions caused breakdown of the refrigerant and the lubricant. The sealed tubes were then opened and samples of the oil (i.e., lubricant) were taken.

The lubricant sample was then placed in Fischer-Porter tubes with the combination of anion exchange resin and zeolite. The amount of dry resin and zeolite relative to the sample were measured. The tubes were then maintained at about 50° C. for 192 hours (8 days). The tubes were shaken every two hours to ensure proper mixing of the resin and the sample.

The Total Acid Number (TAN), iodide ppm and fluoride ppm of the oil were measured at the start (i.e. after degradation of the $CF_3I$ and POE oil, and before combination with the resin and zeolite), and at the end (i.e. after combination with the resin and zeolite, and at the end of the 192 hours at 50° C.). TAN, fluoride and iodide concentration were measured according to the same methods as Example 1.

The results are set out in Table 4 below.

TABLE 4

Effect of anion exchange resin and zeolite on TAN, fluoride and iodide concentration

| Temp. | Zeolite: Ion Exchange (IE) | TAN Start | TAN End | Fluoride (ppm) Start | Fluoride (ppm) End | Iodide (ppm) Start | Iodide (ppm) End |
|---|---|---|---|---|---|---|---|
| 50° C. | 100% IE | 8.71 | 3.20 | 23.3 | 5.4 | 26.9 | <0.05 |
|  | 25%:75% | 8.71 | <0.05 | 23.3 | 0.8 | 26.9 | <0.05 |
|  | 50%:50% | 8.71 | 0.14 | 23.3 | 3.1 | 26.9 | <0.05 |
|  | 75%:25% | 8.71 | 0.96 | 23.3 | 5.4 | 26.9 | <0.05 |
|  | 100% Zeolite | 8.71 | 2.93 | 23.3 | 5.3 | 26.9 | <0.05 |

The above tests demonstrate the ability of combination of anion exchange resins and zeolite to effectively "recover" a composition of POE oil and a $CF_3I$ refrigerant after it has degraded. The results demonstrate that both resins were able to reduce the iodide and the fluoride level of the degraded sample at 50° C. when using different ratios of anion exchange resin and zeolite. The zeolite to ion-exchange weight 25:75 showed maximum reduction in the TAN of the sample and also showed highest decrease in iodide and fluoride content (ppm).

Example 5

The level of removal of fluoride, iodide and TAN reduction as a function of the amount of zeolite as a percentage of the heat transfer composition being treated was studied The zeolite tested was UPO IONSIV D7310-C, available form Honeywell UOP. The openings have a size across their largest dimension of from about 15 to about 35 Å.

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 175° C. These conditions caused breakdown of the refrigerant and the lubricant. The sealed tubes were then opened and samples of the oil were taken.

A portion of the lubricant sample produced after the breakdown according to the preceeding paragraph was then filled into 5 Parr Cells, with each of the cells having a different amount (by weight) of zeolite based on the weight of the lubricant placed into the cell. The Parr Cells were then maintained at 50° C. and the material in each cell was tested every 24 hours for 15 days. The Parr Cells were shaken every day to ensure proper mixing of the zeolite and the lubricant.

The Total Acid Number (TAN), iodide ppm and fluoride ppm of the oil were measured at the start (i.e. after degradation of the $CF_3I$ and POE oil, and before combination with the zeolite), and after every 24 hours (i.e. after combination with the zeolite, at 50° C.) for 15 days.

The results of the tests are set out in Table 5 below:

TABLE 5

Effect of zeolite on TAN, fluoride and iodide concentration

| Material | Temp. | Zeolite | TAN Start | TAN 5 days | TAN 15 days | Fluoride (ppm) Start | Fluoride (ppm) 5 days | Fluoride (ppm) 15 days | Iodide (ppm) Start | Iodide (ppm) 5 days | Iodide (ppm) 15 days |
|---|---|---|---|---|---|---|---|---|---|---|---|
| Zeolite | 50° C. | 1 | 4.5 | 4.4 | 4.6 | 7.4 | 1.5 | 0.96 | 370 | 240 | 33 |
| | | 5 | 4.5 | 3.6 | 3.5 | 7.4 | <0.8 | <0.8 | 370 | 130 | 13 |
| | | 10 | 4.5 | 2.6 | 2.6 | 7.4 | <0.8 | <0.8 | 370 | 49 | <4 |
| | | 15 | 4.5 | 2.0 | 2.2 | 7.4 | <0.8 | <0.8 | 370 | 26 | <4 |
| | | 20 | 4.5 | 1.8 | 2 | 7.4 | <0.8 | <0.8 | 370 | 38 | <4 |

The above tests demonstrate the ability of the zeolite to effectively "recover" a composition of lubricant, and in particular POE oil, and a $CF_3I$ refrigerant after it has degraded.

The results indicate that amounts of zeolite greater than 10 pphl are more effective in reducing iodide levels to non-detectable limits, and amount of zeolite material greater than 5 pphl is more effective in reducing the fluoride levels to non-detectable limits. The results also show that amount of zeolite greater than 15 pphl is most effective in reducing the TAN.

Example 6—Preferred Ion Exchange Materials

The ability of an industrial grade weakly base anion exchange adsorbent resin Amberlyst A21 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution.

Applicants have found that Amberlyst A21 is an excellent material for use in accordance with the present invention. It has a macroporous structure makes it physically very stable and resistant to breakage in the present methods and systems, and ii can withstand high flow rates of the refrigeration system over a period of lifetime.

Example 7

The ability of an industrial grade weakly base anion exchange adsorbent resin Amberlyst A21 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. The matrix of Amberlyst A21 is macroporous. Its macroporous structure makes it physically very stable and resistant to breakage. It can withstand high flow rates of the refrigeration system over a period of lifetime. An industrial grade weak base anion exchange resin sold under the trade designation Amberlyst A21 (Free Base) having the following characteristics:

| Product Name | Amberlyst A21 |
|---|---|
| Composition | Moisture content, 58-62% |

-continued

| Limit | 100° C. max. temp. |
|---|---|
| Ionic Form | Free Base (FB) |
| Matrix | Macroporous |
| Particle size | 490-690 μm |
| Concentration of active sites | >4.6 eq/kg >1.3 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the Amberlyst A21. The amount of dry Amberlyst A21 relative to the sample was measured. The parr cells were then maintained at either 50° C. for 20 days. The cells were shaken each day to ensure proper mixing of the Amberlyst A21 and the sample.

The Total Acid Number (TAN), iodide ppm and fluoride ppm of the sample were measured at the start (i.e. after degradation of the $CF_3I$ and POE oil, and before combination with the Amberlyst A21), and at the end (i.e. after combination with the Amberlyst A21). TAN, fluoride and iodide concentration were measured according to the methods as described in the application.

The results of the tests are set out in Table 7.

TABLE 7

Effect of Amberlyst A21 on TAN, fluoride and iodide concentration

| Temp. | Amount of Amberlyst A21 relative to oil sample (wt %) | TAN Start | TAN End | Fluoride (ppm) Start | Fluoride (ppm) End | Iodide (ppm) Start | Iodide (ppm) End |
|---|---|---|---|---|---|---|---|
| 50° C. | 20% | 7.2 | 1.4 | 21 | 1.6 | 620 | 130 |
| | 30% | 7.2 | 0.6 | 21 | 5.2 | 620 | <4 |
| | 40% | 7.2 | 0.4 | 21 | <4 | 620 | <4 |

The above tests demonstrate the ability of the Amberlyst A21 to effectively "recover" a composition of POE oil and a $CF_3I$ refrigerant after it has degraded.

The results demonstrate that the Amberlyst A21 was able to reduce the iodide and the fluoride level below detectable limits of the degraded sample at 50° C. when using 30 wt % Amberlyst A21 and above.

Example 8

The ability of an industrial grade weakly base anion exchange adsorbent resin Amberlyst A22 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. Its macroporous structure makes it physically very stable and resistant to breakage. It can withstand high flow rates of the refrigeration system over a period of lifetime. An industrial grade weak basic anion exchange resin sold under the trade designation Amberlyst A22 having the following characteristics:

| | |
|---|---|
| Product Name | Amberlyst A22 |
| Composition | Moisture content, 40-50% |
| Limit | 100° C. max. temp. |
| Ionic Form | Free Base (FB) |
| Structure | Styrene-divinylbenzene |
| Matrix | Macroporous |
| Particle size | 475-600 μm |
| Capacity | >1.7 eq/L |

A mixture of 80 wt % POE oil (POE ISO 32, Emkarate RL 32-3MAF) which comprises primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the Amberlyst A22. The amount of dry Amberlyst A22 relative to the sample was measured. The parr cells were then maintained at either 50° C. for 20 days. The cells were shaken each day to ensure proper mixing of the Amberlyst A22 and the sample.

The Total Acid Number (TAN), iodide ppm and fluoride ppm of the sample were measured at the start (i.e. after degradation of the $CF_3I$ and POE oil, and before combination with the Amberlyst A22), and at the end (i.e. after combination with the Amberlyst A22). TAN, fluoride and iodide concentration were measured according to the methods as described in the application.

The results of the tests are set out in Table 8.

TABLE 8

Effect of Amberlyst A22 on TAN, fluoride and iodide concentration

| | Amount of Amberlyst A22 relative to oil | TAN | | Fluoride (ppm) | | Iodide (ppm) | |
|---|---|---|---|---|---|---|---|
| Temp. | sample (wt %) | Start | End | Start | End | Start | End |
| 50° C. | 10% | 4.3 | 1.3 | 6.0 | <0.8 | 170 | 140 |
| | 20% | 4.3 | 0.8 | 6.0 | <0.8 | 170 | 74 |

The above tests demonstrate the ability of the Amberlyst A22 to effectively "recover" a composition of POE oil and a $CF_3I$ refrigerant after it has degraded.

The results demonstrate that the Amberlyst A22 was able to reduce the iodide and the fluoride level of the degraded sample at 50° C. when using 10 wt % and 30 wt % of Amberlyst A22.

Example 9

The ability of an industrial grade weakly base anion exchange adsorbent resin Amberlite IRA96 to act as a sequestration material was tested. Weak Base Anion Resin are in the free base form and are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. Its macroporous structure makes it physically very stable and resistant to breakage. It can withstand high flow rates of the refrigeration system over a period of lifetime. The high porosity of this resin allows efficient adsorption of large organic molecules. An industrial grade weak basic anion exchange resin sold under the trade designation Amberlite IRA96 having the following characteristics:

| | |
|---|---|
| Product Name | Amberlite IRA96 |
| Composition | Moisture content, 59-65% |
| Limit | 100° C. max. temp. |
| Ionic Form | Free Base (FB) |
| Structure | Macroporous |
| Matrix | Styrene divinylbenzene copolymer |
| Functional Group | Tertiary amine |
| Particle size | 630-830 μm |
| Concentration of active sites | >1.25 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the AmberliteIRA96. The amount of dry AmberliteIRA96 relative to the sample was measured. The parr cells were then maintained at either 50° C. for 20 days. The cells were shaken each day to ensure proper mixing of the AmberliteIRA96 and the sample.

The Total Acid Number (TAN), iodide ppm and fluoride ppm of the sample were measured at the start (i.e. after degradation of the $CF_3I$ and POE oil, and before combination with the AmberliteIRA96), and at the end (i.e. after combination with the AmberliteIRA96). TAN, fluoride and iodide concentration were measured according to the methods as described in the application.

The results of the tests are set out in Table 10.

TABLE 10

Effect of Amberlite on TAN, fluoride and iodide concentration

| | Amount of AmberliteIRA96 relative to oil | TAN | | Fluoride (ppm) | | Iodide (ppm) | |
|---|---|---|---|---|---|---|---|
| Temp. | sample (wt %) | Start | End | Start | End | Start | End |
| 50° C. | 20% | 6.3 | 0.2 | 30 | <0.8 | 1000 | 130 |
| | 30% | 6.3 | <0.2 | 30 | <0.8 | 1000 | <4 |
| | 40% | 6.3 | <0.2 | 30 | <0.8 | 1000 | <4 |

The above tests demonstrate the ability of the AmberliteIRA96 to effectively "recover" a composition of POE oil and a $CF_3I$ refrigerant after it has degraded.

The results demonstrate that the AmberliteIRA96 was able to reduce the iodide and the fluoride level below detectable limits of the degraded sample at 50° C. when using 30 wt % AmberliteIRA96 and above.

Example 10

The ability of an industrial grade activated alumina F200 to act as a sequestration material was tested.

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with industrial grade activated alumina F200. The amount of activated alumina relative to the sample was measured. The parr cells were then maintained at either 50° C. for 20 days. The cells were shaken each day to ensure proper mixing of the sample.

The Total Acid Number (TAN), iodide ppm and fluoride ppm of the sample were measured at the start (i.e. after degradation of the $CF_3I$ and POE oil, and before exposure to F200), and at the end (i.e. after exposure to F200). TAN, fluoride and iodide concentration were measured per the methods described in the application.

The results of the tests are set out in Table 11.

TABLE 11

Effect of Activated Alumina F200 on TAN, fluoride and iodide concentration

| Temp. | Amount of F200 relative to oil sample (wt %) | TAN Start | TAN End | Fluoride (ppm) Start | Fluoride (ppm) End | Iodide (ppm) Start | Iodide (ppm) End |
|---|---|---|---|---|---|---|---|
| 50° C. | 20% | 7.2 | 1.6 | 21 | 1.4 | 620 | 72 |
| | 30% | 7.2 | 1.0 | 21 | 1.0 | 620 | 37 |
| | 40% | 7.2 | 1.3 | 21 | 0.9 | 620 | 64 |

Example 11

The ability of combination of a Amberlyst A21 and Zeolite IONSIV D7310-C as sequestration material was tested.

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the sequestration material. The amount of sequestration material relative to the sample was 20% by weight. The parr cells were then maintained at either 50° C. for 20 days. The cells were shaken each day to ensure proper mixing of the sample.

The Total Acid Number (TAN), iodide ppm and fluoride ppm of the sample were measured at the start (i.e. after degradation of the $CF_3I$ and POE oil, and before exposure to sequestration material), and at the end (i.e. after exposure to sequestration material). TAN, fluoride and iodide concentration were measured per the methods described in the application.

The results of the tests are set out in Table 12.

TABLE 12

Effect of Amberlyst A21 and Zeolite IONSIV D7310-C combination on TAN, fluoride and iodide concentration

| Temp. | A21: Zeolite (by weight) | TAN Start | TAN End | Fluoride (ppm) Start | Fluoride (ppm) End | Iodide (ppm) Start | Iodide (ppm) End |
|---|---|---|---|---|---|---|---|
| 50° C. | 100% A21 | 19 | 3.1 | 100 | 2.4 | 570 | 9 |
| | 85:15 | 19 | 3.4 | 100 | 1.8 | 570 | <4 |
| | 75:25 | 19 | 3.8 | 100 | 2.8 | 570 | <4 |
| | 65:35 | 19 | 4.0 | 100 | 1.8 | 570 | <4 |
| | 50:50 | 19 | 8.0 | 100 | 2.4 | 570 | <4 |
| | 100% Zeolite | 19 | 12.0 | 100 | 5.6 | 570 | <4 |

The invention claimed is:

1. A method for providing heat transfer of the type comprising evaporating refrigerant liquid to produce a refrigerant vapor, compressing in a compressor at least a portion of the refrigerant vapor and condensing refrigerant vapor in the condenser in a plurality of repeating cycles, said method comprising:
   (a) providing a refrigerant comprising at least about 5% by weigh of a lower alkyl iodofluorocarbon;
   (b) optionally providing lubricant for said compressor; and
   (b) exposing at least a portion of said refrigerant and/or at least a portion of said lubricant in at least a portion of said plurality of said cycles to a sequestration material included in a filtration element, said sequestration material comprising one or more of:
      i. copper or a copper alloy,
      ii. activated alumina
      iii. a zeolite molecular sieve comprising copper, silver, lead or a combination thereof,
      iv an anion exchange resin, and
      v. a moisture-removing material,
   wherein said sequestration material comprises at least activated alumina and
   wherein said exposing temperature is above about 10° C.

2. The method of claim 1, wherein said molecular sieve is present and wherein said molecular sieve is a zeolite.

3. The method of claim 1 wherein the sequestration material further comprises a molecular sieve comprising copper, silver, lead or a combination thereof.

4. The method of claim 1 wherein the sequestration material further comprises an anion exchange resin.

5. The method of claim 1, wherein the sequestration material comprises copper or a copper alloy.

6. The method of claim 1, wherein the sequestration material comprises copper, or a copper alloy, and a molecular sieve comprising copper, silver, lead or a combination thereof.

7. The method of claim 1, wherein the sequestration material comprises a combination of activated alumina, a zeolite molecular sieve comprising copper, silver, lead or a combination thereof, an anion exchange resin, and a moisture-removing material.

8. The method of claim 1 were said sequestration material is in the form of a solid core.

9. The method of claim 8 were said solid core is located in a liquid line of said condenser.

10. The method of claim 8 wherein lubricant for said compressor is present and wherein said method further comprises providing an oil separator and wherein said solid core is located in said oil separator.

11. The method of claim 1 wherein lubricant for said compressor is present and wherein said method further comprises providing an oil separator and wherein said sequestration material is located in said oil separator.

12. The method of claim 1 wherein when the sequestration material comprises an anion exchange resin, the anion exchange resin comprises a positively charged matrix and exchangeable anions selected from chloride anions ($Cl^-$) or hydroxide anions ($OH^-$).

13. The method of claim 1 wherein when the sequestration material comprises an anion exchange resin, the anion exchange resin is a weakly basic anion exchange resin.

14. The method of claim 1 wherein when the sequestration material comprises copper or a copper alloy, the copper or copper alloy has a surface area of from about 0.01 to about 1.5 $m^2$ per kg of refrigerant.

15. The method of claim 1 wherein the sequestration material comprises a moisture-removing molecular sieve.

16. The method of claim 14 wherein the copper or copper alloy has a surface area of from about 0.02 to about 0.5 $m^2$ per kg of refrigerant.

17. The method of claim 14 wherein the copper or copper alloy has a surface area of about 0.08 $m^2$ per kg of refrigerant.

* * * * *